United States Patent
Fan et al.

(10) Patent No.: US 12,483,916 B2
(45) Date of Patent: Nov. 25, 2025

(54) RESOURCE MEASUREMENT METHOD AND APPARATUS

(71) Applicant: Huawei Technologies Co., Ltd., Shenzhen (CN)

(72) Inventors: Bo Fan, Chengdu (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 17/720,803

(22) Filed: Apr. 14, 2022

(65) Prior Publication Data

US 2022/0240120 A1 Jul. 28, 2022

Related U.S. Application Data

(63) Continuation of application No. PCT/CN2020/121253, filed on Oct. 15, 2020.

(30) Foreign Application Priority Data

Oct. 15, 2019 (CN) .......................... 201910979487.5

(51) Int. Cl.
*H04W 24/10* (2009.01)
*H04B 17/318* (2015.01)
(Continued)

(52) U.S. Cl.
CPC ........... *H04W 24/10* (2013.01); *H04W 24/08* (2013.01); *H04B 17/318* (2015.01); *H04B 17/336* (2015.01)

(58) Field of Classification Search
None
See application file for complete search history.

(56) References Cited

U.S. PATENT DOCUMENTS

| 2019/0109679 A1 | 4/2019 | Liu et al. |
| 2019/0297603 A1 | 9/2019 | Guo et al. |

(Continued)

FOREIGN PATENT DOCUMENTS

| CN | 108964862 A | 12/2018 |
| CN | 109151887 A | 1/2019 |

(Continued)

OTHER PUBLICATIONS

Sony, "Considerations on Multi-TRP/Panel Transmission", 3GPP TSG RAN WG1 Meeting #94, R1-1810643, Gothenburg, Sweden, Aug. 20-24, 2018, 3 pages.

(Continued)

*Primary Examiner* — Scott M Sciacca
(74) *Attorney, Agent, or Firm* — Slater Matsil, LLP

(57) ABSTRACT

This application provides a resource measurement method and an apparatus. A terminal receives measurement configuration information including N resource sets, and determines, based on a value of N, to send a first measurement result or a second measurement result to a network device. Specifically, the terminal sends the first measurement result to the network device when N>1, where the first measurement result is used to indicate m resources, downlink signals corresponding to the m resources can be simultaneously received by the terminal, and the m resources are in a one-to-one correspondence with m resource sets in the N resource sets. The terminal sends the second measurement result to the network device when N=1.

18 Claims, 7 Drawing Sheets

(51) Int. Cl.
*H04W 24/08* (2009.01)
*H04B 17/336* (2015.01)

(56) References Cited

U.S. PATENT DOCUMENTS

| | | | | |
|---|---|---|---|---|
| 2020/0059290 | A1* | 2/2020 | Pan | H04B 7/0857 |
| 2021/0345141 | A1* | 11/2021 | Cao | H04W 24/10 |
| 2022/0191726 | A1* | 6/2022 | Matsumura | H04B 17/336 |
| 2023/0344497 | A1* | 10/2023 | Wang | H04B 7/0639 |

FOREIGN PATENT DOCUMENTS

| | | |
|---|---|---|
| CN | 109842470 A | 6/2019 |
| CN | 110139306 A | 8/2019 |
| WO | 2018062937 A1 | 4/2018 |
| WO | 2019094781 A2 | 5/2019 |
| WO | 2019183878 A1 | 10/2019 |
| ZM | 2018085601 A1 | 5/2018 |

OTHER PUBLICATIONS

3GPP TS 38.214 V15.7.0 (Sep. 2019), 3rd Generation Partnership Project; Technical Specification Group Radio Access Network; NR; Physical layer procedures for data (Release 15), 106 pages.
3GPP TS 38.331 V15.5.0 (Mar. 2019), 3rd Generation Partnership Project; Technical Specification Group Radio Access Network; NR; Radio Resource Control (RRC) protocol specification (Release 15), 491 pages.
ZTE, "Enhancements on multi-beam operation", 3GPP TSG RAN WG1 Meeting #94, R1-1808199, Gothenburg, Sweden, Aug. 20-24, 2018, 5 pages.
3GPP TS 38.212 V15.7.0 (Sep. 2019), 3rd Generation Partnership Project; Technical Specification Group Radio Access Network; NR; Multiplexing and channel coding (Release 15), 101 pages.
3GPP TS 38.211 V15.5.0 (Mar. 2019), 3rd Generation Partnership Project; Technical Specification Group Radio Access Network; NR; Physical channels and modulation (Release 15), 96 pages.
3GPP TS 38.212 V15.5.0 (Mar. 2019), 3rd Generation Partnership Project; Technical Specification Group Radio Access Network; NR; Multiplexing and channel coding (Release 15), 101 pages.
3GPP TS 38.213 V15.5.0 (Mar. 2019), 3rd Generation Partnership Project; Technical Specification Group Radio Access Network; NR; Physical layer procedures for control (Release 15), 104 pages.
3GPP TS 38.214 V15.5.0 (Mar. 2019), 3rd Generation Partnership Project; Technical Specification Group Radio Access Network; NR; Physical layer procedures for data (Release 15), 103 pages.
CMCC, "Enhancements on multi-beam operation", 3GPP TSG RAN WG1 #98bis, R1-1910171, Oct. 14-20, 2019, 8 Pages, Chongqing, China.
ZTE, "Further details on multi-beam/TRP operation", 3GPP TSG RAN WG1 Meeting #98bis, R1-1910287, Oct. 14-20, 2019, 16 Pages, Chongqing, China.

* cited by examiner

RESOURCE MEASUREMENT METHOD AND APPARATUS

CROSS-REFERENCE TO RELATED APPLICATIONS

This application is a continuation of International Application No. PCT/CN2020/121253, filed on Oct. 15, 2020, which claims priority to Chinese Patent Application No. 201910979487.5, filed on Oct. 15, 2019. The disclosures of the aforementioned applications are hereby incorporated by reference in their entireties.

TECHNICAL FIELD

This application relates to the communication field, and more specifically, to a resource measurement method and an apparatus.

BACKGROUND

In a conventional solution, when a group-based reporting criterion parameter in a measurement reporting configuration is configured to an enabled state, a terminal reports, to a network device, two resources (namely, beams) that satisfy a condition. The condition is that signals sent by the network device on the two beams can be simultaneously received by the terminal. In this way, the network device can determine two specific beams for sending signals to the terminal, so that the terminal can simultaneously receive the signals.

However, the two beams selected by the terminal may belong to a same transmission reception point (TRP). Therefore, how to select beams from different TRPs to implement multi-station data transmission needs to be resolved urgently.

SUMMARY

This application provides a resource measurement method and an apparatus, to implement multi-station data transmission.

According to a first aspect, a resource measurement method is provided. The method includes: receiving measurement configuration information, where the measurement configuration information includes N resource sets, and each of the N resource sets includes one or more resources, where N≥1, and N is an integer; and sending a first measurement result to a network device when N>1, where the first measurement result is used to indicate m resources, downlink signals corresponding to the m resources can be received by a terminal, and the m resources are in a one-to-one correspondence with m resource sets in the N resource sets, where m>1, and m is an integer; or sending a second measurement result to a network device when N=1, where the second measurement result is used to indicate m resources, downlink signals corresponding to the m resources can be simultaneously received by a terminal, and the m resources are resources in the N=1 resource set.

Optionally, the first measurement result or the second measurement result may be sent to the network device by using a resource reporting method described in the following seventh aspect, to indicate the m resources.

Further, the downlink signals corresponding to the m resources can be simultaneously received by the terminal, the downlink signals corresponding to the m resources can be received by the terminal in a period of time, or the downlink signals corresponding to the m resources are downlink signals simultaneously sent by the network device.

That the downlink signals correspond to the m resources may be: One resource corresponds to one downlink signal, that is, the downlink signal may be transmitted by using the resource. Alternatively, a plurality of resources correspond to one downlink signal, that is, the downlink signal may be transmitted by using the plurality of resources. The terminal may select one resource from each of the N resource sets, and report the resource to the network device by using a measurement result. This helps the terminal simultaneously transmit data with a plurality of TRPs when the N resource sets correspond to different TRPs.

After receiving the measurement configuration information, the terminal may send the first measurement result to the network device. Alternatively, after receiving the measurement configuration information, the terminal may send the second measurement result to the network device.

It may be understood that the m channel resources are resources whose corresponding downlink signals can be simultaneously received by the terminal, or in other words, the terminal can simultaneously receive signals sent on the m channel resources. Specifically, that the terminal can simultaneously receive signals sent on the m channel resources may mean: The terminal is capable of simultaneously receiving the downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

In some possible implementations, the N resource sets are in a one-to-one correspondence with N TRPs.

In some possible implementations, the sending a first measurement result to a network device when N>1 includes: sending the first measurement result to the network device when N>1 and a group-based beam reporting parameter in the measurement configuration information indicates enabled.

In some possible implementations, the sending a second measurement result to a network device when N=1 includes: sending the second measurement result to the network device when N=1 and a group-based beam reporting parameter in the measurement configuration information indicates enabled.

When a quantity N of resource sets is greater than 1 and the group-based beam reporting parameter indicates enabled, the terminal may select one resource from each of the N resource sets, and report the resource to the network device by using a measurement result. If the N resource sets correspond to different TRPs, the terminal can simultaneously transmit data with a plurality of TRPs.

According to a second aspect, a resource measurement method is provided. The method includes: sending measurement configuration information, where the measurement configuration information includes N resource sets, and each of the N resource sets includes one or more resources, where N≥1, and N is an integer; and receiving a first measurement result, where the first measurement result is used to indicate m resources, downlink signals corresponding to the m resources can be simultaneously received by a terminal, and the m resources are in a one-to-one correspondence with m resource sets in the N resource sets, where m≥2, and m is an integer; or receiving a second measurement result, where the second measurement result is used to indicate m resources, downlink signals corresponding to the m resources can be simultaneously received by a terminal, and the m resources are resources in the N resource sets.

The network device sends the measurement configuration information including the N resource sets, so that the terminal may select one resource from each of the N resource sets, and report the resource to the network device by using a measurement result. This helps the terminal simultaneously transmit data with a plurality of TRPs when the N resource sets correspond to different TRPs.

Further, the downlink signals corresponding to the m resources can be simultaneously received by the terminal, the downlink signals corresponding to the m resources can be received by the terminal in a period of time, or the downlink signals corresponding to the m resources are downlink signals simultaneously sent by the network device.

It may be understood that the m channel resources are resources whose corresponding downlink signals can be simultaneously received by the terminal, or in other words, the terminal can simultaneously receive signals sent on the m channel resources. Specifically, that the terminal can simultaneously receive signals sent on the m channel resources may mean: The terminal is capable of simultaneously receiving the downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

In some possible implementations, the N resource sets are in a one-to-one correspondence with N TRPs.

According to a third aspect, a resource measurement method is provided. The method includes: receiving measurement configuration information, where the measurement configuration information includes m resource configurations corresponding to m cells, m≥2, and m is a positive integer; and sending at least one measurement result, where the at least one measurement result is used to indicate m resources, downlink signals corresponding to the m resources can be received by a terminal, and the m resources are in a one-to-one correspondence with the m resource configurations.

Optionally, the at least one measurement result may be sent to a network device by using a resource reporting method described in the following seventh aspect, to indicate the m resources.

That the m cells correspond to m resource configurations may be: Each cell corresponds to one resource configuration. The terminal receives the measurement configuration information that includes the m resource configurations corresponding to the m cells, and selects one resource from each of the m resource configurations, to form the m resources that can be simultaneously received by the terminal. This helps the terminal simultaneously transmit data with TRPs in a plurality of cells.

Further, the downlink signals corresponding to the m resources can be simultaneously received by the terminal, the downlink signals corresponding to the m resources can be received by the terminal in a period of time, or the downlink signals corresponding to the m resources are downlink signals simultaneously sent by the network device.

It may be understood that the m channel resources are resources whose corresponding downlink signals can be simultaneously received by the terminal, or in other words, the terminal can simultaneously receive signals sent on the m channel resources. Specifically, that the terminal can simultaneously receive signals sent on the m channel resources may mean: The terminal is capable of simultaneously receiving the downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

In some possible implementations, the measurement configuration information further includes one or more reporting configurations, and the sending at least one measurement result includes: sending the at least one measurement result based on at least one of the one or more reporting configurations.

The measurement result obtained by measuring the m resources may be reported by using one reporting configuration. In this way, the terminal does not need to report the measurement result based on different reporting configurations, thereby reducing power consumption overheads of the terminal.

In some possible implementations, the sending the at least one measurement result based on at least one of the one or more reporting configurations includes: sending a first measurement result based on a first reporting configuration, where the first measurement result is used to indicate the m resources, and the first reporting configuration is any one of the one or more reporting configurations.

The m resources selected from the m resource configurations may be indicated by using one measurement result (namely, the first measurement result). In other words, the terminal may send the first measurement result to TRPs in a plurality of cells together. In this way, the terminal does not need to separately identify different network devices, and does not need to send different measurement results to the corresponding network devices.

In some possible implementations, the sending a first measurement result based on a first reporting configuration includes: sending the first measurement result when the first reporting configuration satisfies at least one of the following conditions: a group-based beam reporting parameter in the first reporting configuration is configured as enabled; and the first reporting configuration has an association relationship with the m resource configurations.

When the at least one of the foregoing conditions is satisfied, the terminal performs reporting by using one reporting configuration (that is, the first reporting configuration). Otherwise, the terminal may perform reporting by using the m reporting configurations. In this way, the terminal can automatically identify a reporting manner of the measurement result, thereby improving flexibility of reporting the measurement result by the terminal.

In some possible implementations, the sending the at least one measurement result based on at least one of the one or more reporting configurations includes: separately sending m measurement results based on m reporting configurations, where each of the m measurement results is used to indicate one of the m resources.

The measurement result obtained by measuring the m resources may alternatively be reported by using the m reporting configurations. In other words, a measurement result of each resource is reported based on a corresponding reporting configuration. In this way, the terminal can separately report the measurement result based on configurations configured by the network device for different resources, thereby improving reporting accuracy.

In some possible implementations, the sending m measurement results based on m reporting configurations includes: sending the m measurement results when the m reporting configurations satisfy at least one of the following conditions: group-based reporting parameters in some or all of the m reporting configurations are configured as enabled; and the m reporting configurations have an association relationship with each other.

When the at least one of the foregoing conditions is satisfied, the terminal performs reporting by using the m reporting configurations. Otherwise, the terminal may perform reporting by using one reporting configuration. In this way, the terminal can automatically identify a reporting manner of the measurement result, thereby improving flexibility of reporting the measurement result by the terminal.

According to a fourth aspect, a resource measurement method is provided. The method includes: sending measurement configuration information, where the measurement configuration information includes m resource configurations corresponding to m cells, m≥2, and m is a positive integer; and receiving at least one measurement result, where the at least one measurement result is used to indicate m resources, downlink signals corresponding to the m resources can be received by a terminal, and the m resources are in a one-to-one correspondence with the m resource configurations.

A network device sends, to the terminal, the measurement configuration information that includes the m resource configurations corresponding to the m cells, so that the terminal selects one resource from each of the m resource configurations, to form the m resources that can be simultaneously received by the terminal. This helps the terminal simultaneously transmit data with TRPs in a plurality of cells.

Further, the downlink signals corresponding to the m resources can be simultaneously received by the terminal, the downlink signals corresponding to the m resources can be received by the terminal in a period of time, or the downlink signals corresponding to the m resources are downlink signals simultaneously sent by the network device.

It may be understood that the m channel resources are resources whose corresponding downlink signals can be simultaneously received by the terminal, or in other words, the terminal can simultaneously receive signals sent on the m channel resources. Specifically, that the terminal can simultaneously receive signals sent on the m channel resources may mean: The terminal is capable of simultaneously receiving the downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

According to a fifth aspect, a resource measurement method is provided. The method includes: receiving measurement configuration information, where the measurement configuration information includes a first resource configuration and a first reporting configuration, the first reporting configuration is associated with K target resources, and K is an integer greater than or equal to 1; and sending a first measurement result to a network device, where the first measurement result is used to indicate L resources, and the L resources satisfy a first constraint relationship with the K target resources.

Optionally, the first measurement result or a second measurement result may be sent to the network device by using a resource reporting method described in the following seventh aspect, to indicate the L resources.

The terminal receives the measurement configuration information including the first reporting configuration. The first reporting configuration is associated with the K target resources. The terminal can determine, based on the measurement configuration information, the L resources that satisfy the first constraint relationship with the K target resources, and report the L resources to the network device by using the first measurement result. In this way, the terminal can determine, based on the association relationship between the first reporting configuration and the K target resources, the L resources that satisfy the first constraint relationship with the K target resources, and notify the network device of the L resources. This avoids directly configuring resources that have a constraint relationship and reduces overheads.

In some possible implementations, that the L resources satisfy the first constraint relationship with the K target resources means any one of the following: downlink signals corresponding to the L resources and the K target resources can be simultaneously received by the terminal; the L resources and the K target resources correspond to different receive antenna panels; and the L resources and the K target resources correspond to a same receive space parameter.

In some possible implementations, the K target resources may be any one of the following: a non-zero-power channel state information-reference signal (NZP CSI-RS) resource, a channel state information-interference measurement (CSI-IM) resource, a synchronization signal and PBCH block (SSB) resource, a tracking reference signal (TRS) resource, and a phase tracking reference signal (PTRS) resource.

According to a sixth aspect, a resource measurement method is provided. The method includes: sending measurement configuration information, where the measurement configuration information includes a first resource configuration and a first reporting configuration, the first reporting configuration is associated with K target resources, and K is an integer greater than or equal to 1; and receiving a first measurement result, where the first measurement result is used to indicate L resources, and the L resources satisfy a first constraint relationship with the K target resources.

The network device sends, to the terminal, the measurement configuration information including the first reporting configuration. The first reporting configuration is associated with the K target resources. The terminal can determine, based on the measurement configuration information, the L resources that satisfy the first constraint relationship with the K target resources, and report the L resources to the network device by using the first measurement result. In this way, the terminal can determine, based on the association relationship between the first reporting configuration and the K target resources, the L resources that satisfy the first constraint relationship with the K target resources, and notify the network device of the L resources. This avoids directly configuring resources that have a constraint relationship and reduces overheads.

In some possible implementations, that the L resources satisfy the first constraint relationship with the K target resources means any one of the following: downlink signals corresponding to the L resources and the K target resources can be simultaneously received by the terminal; the L resources and the K target resources correspond to different receive antenna panels; and the L resources and the K target resources correspond to a same receive space parameter.

In some possible implementations, the K target resources may be any one of the following: a non-zero-power channel state information-reference signal (NZP CSI-RS) resource, a channel state information-interference measurement (CSI-IM) resource, a synchronization signal and PBCH block (SSB) resource, a tracking reference signal (TRS) resource, and a phase tracking reference signal (PTRS) resource.

According to a seventh aspect, a resource reporting method is provided. The method includes: reporting K resource groups, where each of the K resource groups includes L resources, the L resources respectively belong to L different resource sets, and the resource set includes one or more of the following: a resource set and a resource setting, where K≥1 and L≥1.

In some possible implementations, the reporting the K resource groups includes: reporting the K resource groups in a first reporting format or a second reporting format.

In some possible implementations, the first reporting format includes: consecutively arranging resources belonging to a same resource group, and sequentially arranging the K resource groups; arranging the K resource groups in a first order; and arranging resources in each resource group in a second order.

In some possible implementations, the first order includes: an order of first reference signal received powers RSRPs/signal to interference plus noise ratios SINRs, where the first RSRP/SINR is an RSRP/SINR of a resource with the largest RSRP/SINR in a resource group.

In some possible implementations, the second order includes: a configuration order of resource sets corresponding to resources in each resource group; an index order of resource sets corresponding to resources in each resource group; or an RSRP/SINR order of resources in each resource group.

In some possible implementations, the first reporting format further includes one or more of the following: an arrangement position of a first resource in each of the L resource sets, or information of a resource group corresponding to the first resource, where the first resource is a reported resource with the largest RSRP/SINR in each resource set; a relative arrangement position of a resource with the largest RSRP/SINR in all resources in the K resource groups; information of a resource group corresponding to a resource with the largest RSRP/SINR in the K resource groups; and information of a resource set corresponding to a resource with the largest RSRP/SINR in the K resource groups.

In some possible implementations, the second reporting format includes: consecutively arranging resources belonging to a same resource set, and sequentially arranging the L resource sets; arranging the L resource sets in a third order; and arranging resources in each resource set in a fourth order.

In some possible implementations, the third order includes: a configuration order of resource sets; an index order of resource sets; or an order of second RSRPs/SINRs, where the second RSRP/SINR is an RSRP/SINR of a resource with the largest RSRP/SINR in a resource set.

In some possible implementations, the fourth order includes a configuration order of resources, an index order of resources, or an RSRP/SINR order of resources.

In some possible implementations, the second reporting format further includes one or more of the following: an arrangement position of a second resource in each of the K resource groups, or information of a resource group corresponding to the second resource, where the second resource is a reported resource with the largest RSRP/SINR in each resource group; a relative arrangement position of a resource with the largest RSRP/SINR in all resources in the K resource groups; information of a resource group corresponding to a resource with the largest RSRP/SINR in the K resource groups; and information of a resource set corresponding to a resource with the largest RSRP/SINR in the K resource groups.

In some possible implementations, the method further includes: reporting an RSRP/SINR corresponding to each resource in the K resource groups, where an arrangement order of RSRPs/SINRs is the same as an arrangement order of corresponding resources.

In some possible implementations, the reporting an RSRP/SINR corresponding to each resource in the K resource groups includes: reporting the RSRP/SINR of each resource in the K resource groups in a first differential reporting criterion or a second differential reporting criterion, where the first differential reporting criterion includes: reporting an RSRP/SINR of a resource with the largest RSRP/SINR in each resource set, and reporting an RSRP/SINR difference between each resource other than the resource with the largest RSRP/SINR in the resource set and the resource with the largest RSRP/SINR; and the second differential reporting criterion includes: reporting an RSRP/SINR of a resource with the largest RSRP/SINR in the K resource groups, and reporting an RSRP/SINR difference between each resource other than the resource with the largest RSRP/SINR in the K resource groups and the resource with the largest RSRP/SINR.

According to an eighth aspect, a transmission resource determining apparatus is provided. The apparatus may be a terminal, or may be a chip in the terminal. The apparatus has a function of implementing any one of the first aspect, the third aspect, the fifth aspect, or the seventh aspect, or various possible implementations thereof. The function may be implemented by using hardware, or may be implemented by hardware by executing corresponding software. The hardware or the software includes one or more modules corresponding to the function.

In a possible design, the apparatus includes a transceiver module. Optionally, the apparatus further includes a processing module. The transceiver module includes a receiving module and a sending module, and may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module. The processing module may execute the instructions stored in the storage module or instructions from another storage module, to enable the apparatus to perform the method in any one of the first aspect, the third aspect, the fifth aspect, or the seventh aspect, or any implementation thereof.

In another possible design, when the apparatus is a chip, the chip includes a transceiver module. Optionally, the chip further includes a processing module. The transceiver module includes a receiving module and a sending module, and may be, for example, an input/output interface, a pin, or a circuit on the chip. The processing module may be, for example, a processor. The processing module may execute instructions, to enable the chip in the terminal to perform the method in any one of the first aspect, the third aspect, the fifth aspect, or the seventh aspect, or any possible implementation thereof.

Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the method in any one of the first aspect, the third aspect, the fifth aspect, or the seventh aspect, or any possible implementation thereof.

According to a ninth aspect, an apparatus is provided. The apparatus may be a network device, or may be a chip in the network device. The apparatus has a function of implementing any one of the second aspect, the fourth aspect, or the sixth aspect, or various possible implementations thereof. The function may be implemented by using hardware, or may be implemented by hardware by executing corresponding software. The hardware or the software includes one or more modules corresponding to the function.

In a possible design, the apparatus includes a transceiver module. Optionally, the apparatus further includes a processing module. The transceiver module may be, for example, at least one of a transceiver, a receiver, or a transmitter. The receiving module and the sending module may include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another storage module, to enable the apparatus to perform the communication method in any one of the second aspect, the fourth aspect, or the sixth aspect, or various possible implementations thereof. In this design, the apparatus may be a network device.

In another possible design, when the apparatus is a chip, the chip includes a receiving module and a sending module. Optionally, the apparatus further includes a processing module. The receiving module and the sending module may be, for example, an input/output interface, a pin, a circuit, or the like on the chip. The processing module may be, for example, a processor. The processing module may execute instructions, to enable the chip in the network device to perform the method in any one of the second aspect, the fourth aspect, or the sixth aspect, or any possible implementation thereof. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the method in any one of the second aspect, the fourth aspect, or the sixth aspect, or any possible implementation thereof.

According to a tenth aspect, a computer storage medium is provided. The computer storage medium stores program code. The program code is used to indicate instructions for performing the method in any one of the first aspect, the third aspect, the fifth aspect, or the seventh aspect, or any possible implementation thereof.

According to an eleventh aspect, a computer storage medium is provided. The computer storage medium stores program code. The program code is used to indicate instructions for performing the method in any one of the second aspect, the fourth aspect, or the sixth aspect, or any possible implementation thereof.

According to a twelfth aspect, a computer program product including instructions is provided. When the computer program product runs on a computer, the computer is enabled to perform the method in any one of the first aspect, the third aspect, the fifth aspect, or the seventh aspect, or any possible implementation thereof.

According to a thirteenth aspect, a computer program product including instructions is provided. When the computer program product runs on a computer, the computer is enabled to perform the method in any one of the second aspect, the fourth aspect, or the sixth aspect, or any possible implementation thereof.

According to a fourteenth aspect, a communication system is provided. The communication system includes an apparatus that has a function of implementing the method and the various possible designs of the first aspect and an apparatus that has a function of implementing the method and the various possible designs of the second aspect.

According to a fifteenth aspect, a communication system is provided. The communication system includes an apparatus that has a function of implementing the method and the various possible designs of the third aspect and an apparatus that has a function of implementing the method and the various possible designs of the fourth aspect.

According to a sixteenth aspect, a communication system is provided. The communication system includes an apparatus that has a function of implementing the method and the various possible designs of the fifth aspect and an apparatus that has a function of implementing the method and the various possible designs of the sixth aspect.

According to a seventeenth aspect, a processor is provided. The processor is configured to be coupled to a memory, and configured to perform the method in any one of the first aspect, the third aspect, the fifth aspect, or the seventh aspect, or any possible implementation thereof.

According to an eighteenth aspect, a processor is provided. The processor is configured to be coupled to a memory, and configured to perform the method in any one of the second aspect, the fourth aspect, or the sixth aspect, or any possible implementation thereof.

According to a nineteenth aspect, a chip is provided. The chip includes a processor and a communication interface. The communication interface is configured to communicate with an external device or an internal device. The processor is configured to implement the method in any one of the first aspect, the third aspect, the fifth aspect, or the seventh aspect, or any possible implementation thereof.

Optionally, the chip may further include a memory. The memory stores instructions. The processor is configured to execute the instructions stored in the memory or instructions from another memory. When the instructions are executed, the processor is configured to implement the method in any one of the first aspect, the third aspect, the fifth aspect, or the seventh aspect, or any possible implementation thereof.

Optionally, the chip may be integrated to a terminal.

According to a twentieth aspect, a chip is provided. The chip includes a processor and a communication interface. The communication interface is configured to communicate with an external device or an internal device. The processor is configured to implement the method in any one of the second aspect, the fourth aspect, or the sixth aspect, or any possible implementation thereof.

Optionally, the chip may further include a memory. The memory stores instructions. The processor is configured to execute the instructions stored in the memory or instructions from another memory. When the instructions are executed, the processor is configured to implement the method in any one of the second aspect, the fourth aspect, or the sixth aspect, or any possible implementation thereof.

Optionally, the chip may be integrated to a network device.

Based on the foregoing technical solution, a terminal receives measurement configuration information including N resource sets, and determines, based on a value of N, to send a first measurement result or a second measurement result to a network device. Specifically, the terminal sends the first measurement result to the network device when N>1, where the first measurement result is used to indicate m resources, downlink signals corresponding to the m resources can be simultaneously received by the terminal, and the m resources are in a one-to-one correspondence with m resource sets in the N resource sets. The terminal sends the second measurement result to the network device when N=1, where the second measurement result is used to indicate m resources, downlink signals corresponding to the m resources can be simultaneously received by the terminal, and the m resources are resources in the N resource sets. This helps the terminal simultaneously transmit data with a plurality of TRPs when the N resource sets correspond to different TRPs.

DETAILED DESCRIPTION OF ILLUSTRATIVE EMBODIMENTS

Figure 1:
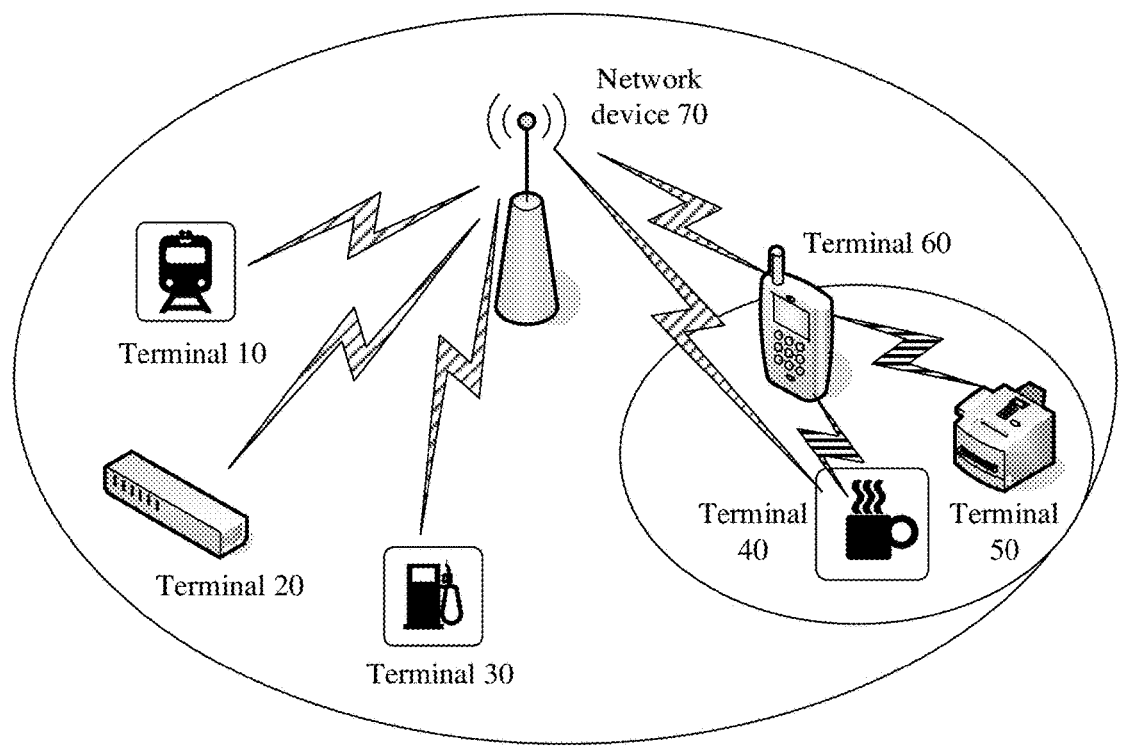
FIG. 1 is a schematic diagram of a communication system according to this application.

The following describes the technical solutions of this application with reference to the accompanying drawings.

1. Beam:

The beam in an NR protocol may be embodied as a spatial domain filter that is also referred to as a spatial filter or a spatial parameter. A beam used to send a signal may be referred to as a transmit beam (Tx beam), or may be referred to as a spatial domain transmit filter or a spatial transmit parameter. A beam used to receive a signal may be referred to as a receive beam (Rx beam), or may be referred to as a spatial domain receive filter or a spatial receive parameter (spatial Rx parameter).

The transmit beam may refer to distribution of signal strength formed in different directions in space after a signal is transmitted by using an antenna, and the receive beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like The beam usually corresponds to a resource. For example, during beam measurement, a network device measures different beams by using different resources, a terminal feeds back measured resource quality, and the network device knows quality of a corresponding beam. During data transmission, beam information is also indicated through a resource corresponding to the beam information. For example, the network device indicates information of a physical downlink shared channel (PDSCH) beam to the terminal by using a resource in a transmission configuration index (TCI) of downlink control information (DCI).

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as one antenna port set.

During beam measurement, each beam of the network device corresponds to one resource. Therefore, an index of the resource may be used to uniquely identify the beam corresponding to the resource.

2. Resource:

During beam measurement, a beam corresponding to a resource may be uniquely identified by using an index of the resource. The resource may be an uplink signal resource, or may be a downlink signal resource. An uplink signal includes but is not limited to a sounding reference signal (SRS) and a demodulation reference signal (DMRS). A downlink signal includes but is not limited to a channel state information reference signal (CSI-RS), a cell-specific reference signal (CS-RS), a UE specific reference signal (US-RS), a demodulation reference signal (DMRS), and a synchronization signal/physical broadcast channel block (SS/PBCH block). The SS/PBCH block may be referred to as a synchronization signal block (SSB) for short.

The resource is configured by using radio resource control (RRC) signaling. In a configuration structure, one resource is one data structure, including a related parameter of an uplink/downlink signal corresponding to the resource, for example, a type of the uplink/downlink signal, a resource element that carries the uplink/downlink signal, transmit time and a transmit periodicity of the uplink/downlink signal, and a quantity of ports used to send the uplink/downlink signal. Each resource of the uplink/downlink signal has a unique index, to identify the resource of the downlink signal. It may be understood that the index of the resource may also be referred to as an identifier of the resource. This is not limited in embodiments of this application.

3. Channel Resource:

The channel resource is a resource configured by the network device for channel measurement. The channel resource may be used to measure channel information such as a reference signal received power (RSRP), a channel quality indicator (CQI), and a signal to interference plus noise ratio (SINR). When the CQI and the SINR are measured, an interference resource further needs to be configured.

4. Interference Resource:

The interference resource is a resource configured by the network device for interference measurement. When the channel information such as the CQI and the SINR is measured, the interference resource is used as an interference source, and the CQI and the SINR of the channel resource are calculated based on the interference source and the channel resource. For example, when an SINR of a channel resource on an interference resource needs to be measured, the SINR may be calculated by using energy of the channel resource as a numerator and energy of the interference resource as a denominator.

5. Group-Based Reporting

The group-based reporting is a special reporting manner. The group-based reporting can be activated by configuring a group-based beam reporting parameter in a measurement configuration as enabled (for example, configured as enabled). Specifically, when the group-based beam reporting is configured as enabled, the terminal selects m resources that can be simultaneously received by the terminal, and reports indexes of the two resources to the network device. m may be an integer greater than or equal to 2.

Specifically, the m resources that can be simultaneously received by the terminal refer to m channel resources that the terminal is capable of simultaneously receiving. To be specific, the terminal is capable of simultaneously receiving downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

It should be understood that, that the group-based beam reporting is configured as enabled may specifically mean: A value of a groupBasedBeamReporting parameter is configured as enabled, or may be in another form. For example, the value of groupBasedBeamReporting may alternatively be in a positive form such as 'on', 'yes', or '1', and is not limited to such a form of 'enabled'. Similarly, that the group-based beam reporting is configured as disabled may specifically mean: A value of a groupBasedBeamReporting parameter is configured as disabled, or may be in another form. For example, the value of groupBasedBeamReporting may alternatively be in a negative form such as 'off', 'no', or '0', and is not limited to such a form of 'disabled'. In addition, the parameter name is not limited to groupBasedBeamReporting, and another parameter name may also be used.

6. Control Resource Set:

The CORESET includes a plurality of physical resource blocks in frequency domain and includes one to three orthogonal frequency division multiplexing technology (OFDM) symbols in time domain, and may be located at any location in a slot. Time domain resources occupied by the CORESET are configured by higher-layer parameters. In NR, a resource configuration of the CORESET cannot be indicated by using dynamic signaling. In frequency domain, a CORESET configuration supports continuous and discrete frequency domain resource configurations, and the configured CORESET does not exceed a frequency domain range of a BWP. In addition, CORESET frequency domain resources are configured at a granularity of six RBs. A CORESET is a set of a plurality of control information resources transmitted on a PDCCH.

It should be noted that, with the continuous development of technologies, the terms in embodiments of this application may change, but all of them shall fall within the protection scope of this application.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future fifth generation (5G) system, or a new radio (NR) system.

The terminal in embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile communication network (PLMN), or the like. This is not limited in embodiments of this application.

The network device in embodiments of this application may be a device configured to communicate with the terminal. The network device may be a base transceiver station (BTS) in a global system for mobile communications (GSM) or code division multiple access (CDMA), may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or one or a group of antenna panels (including a plurality of antenna panels) of a base station in a 5G system, or may be a network node that constitutes a gNB or a transmission point, for example, a baseband unit (BBU) or a distributed unit (DU). This is not limited in embodiments of this application.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that the network device may be a device including one or more of a CU node, a DU node, and an AAU node. In addition, the CU may be classified into a network device in an access network (AN), or may be classified into a network device in a core network (CN). This is not limited in this application.

In embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal or the network device, or may be a functional module that can invoke the program and execute the program in the terminal or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a communication system according to this application. The communication system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communication system. The terminal 60 may send downlink signals to the terminal 40 and the terminal 50, or may receive uplink signals sent by the terminal 40 and the terminal 50.

It should be noted that embodiments of this application may be applied to a communication system including one or more network devices, or may be applied to a communication system including one or more terminals. This is not limited in this application.

It should be understood that the communication system may include one or more network devices. One network device may send data or control signaling to one or more terminals. A plurality of network devices may simultaneously send data or control signaling to one or more terminals.

When a plurality of network devices (for example, a plurality of transmission reception points TRPs) are used to simultaneously transmit data to the terminal, one beam needs to be selected from each of two TRPs, and the two beams can be simultaneously received by the terminal. Two resources that can be simultaneously received may be selected according to an existing group-based reporting mechanism, to determine the two beams that can be simultaneously received. However, it cannot be ensured that the two beams respectively belong to two TRPs. In other words, the two selected beams may belong to a same TRP. In this case, data cannot be simultaneously transmitted for the terminal by using two TRPs.

Therefore, how to select beams from different TRPs to implement multi-station data transmission is a problem to be resolved urgently.

Figure 2:
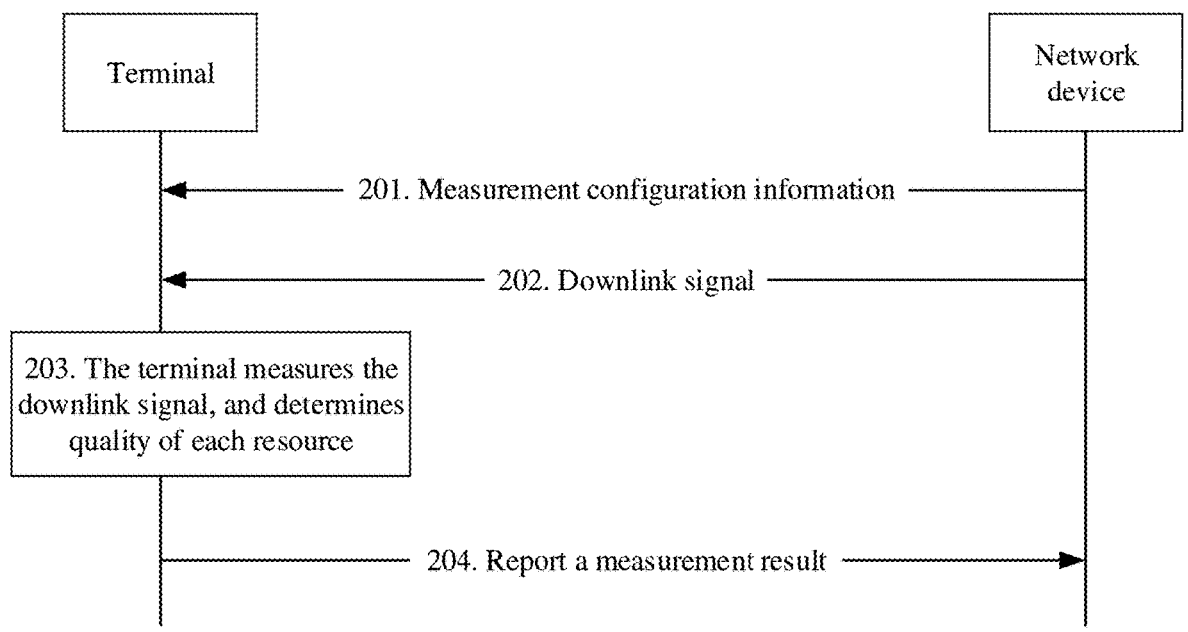
FIG. 2 is a schematic flowchart of a downlink beam measurement method in a conventional solution.

FIG. 2 is a schematic flowchart of a downlink beam measurement method in a conventional solution.

201. A network device sends measurement configuration information to a terminal.

The measurement configuration information may be carried in RRC signaling. The measurement configuration information mainly includes resource configuration information and report configuration information. The resource configuration information is related information used to measure a resource, and may be configured in a protocol by using a three-level structure (that is, a resource configuration), a resource set, and a resource). The network device may configure one or more resource configurations for the terminal. Each resource configuration includes one or more resource sets, and each resource set may include one or more resources. Each resource configuration, each resource set, or each resource includes an index that identifies the resource configuration, the resource set, or the resource. In addition, each resource configuration, each resource set, or each resource may further include some other parameters, for example, a periodicity of a resource and a signal class corresponding to a resource. The reporting configuration information is information related to reporting a measurement result, and is configured in a protocol by using a reporting configuration (for example, the reporting configuration is reportconfig). The network device may configure one or more reporting configurations for the terminal, and each reporting configuration includes reporting-related information such as a reporting indicator, reporting time, a reporting periodicity, and a reporting format. For example, the reporting configuration includes a groupBasedBeamReporting parameter, and the parameter is used to indicate whether the terminal uses a group-based reporting criterion to report the measurement result. Specifically, if a value of the groupBasedBeamReporting parameter is configured as enabled (that is, group-based reporting is enabled), the terminal uses the group-based reporting criterion, that is, reports two resources that can be simultaneously received by the terminal. On the contrary, if a value of the groupBasedBeamReporting parameter is configured as disabled (that is, group-based reporting is disabled), the group-based reporting criterion is not used, that is, one or more resources (for example, one or more resources with optimal quality) are reported, but these resources are not required to be simultaneously received by the terminal. In addition, the reporting configuration further includes an index of a resource configuration, used to indicate a measurement configuration by using which the reporting result is obtained.

202. The network device sends a corresponding downlink signal based on the resource configuration. To be specific, the network device sends, at a time-frequency resource location corresponding to each configured resource, a downlink signal corresponding to the resource.

203. The terminal measures the downlink signal to determine quality of each resource (that is, quality of a beam corresponding to the resource). It should be noted that there is a one-to-one correspondence between the downlink signal, the resource, and the beam herein, and the quality of the resource and the quality of the beam can be obtained by measuring quality of the downlink signal. If the group-based reporting is enabled, the terminal determines, through measurement, two resources that can be simultaneously received by the terminal. If the group-based reporting is disabled, the terminal determines one or more resources (for example, based on quality of the resources). The one or more resources do not need to be simultaneously received by the terminal.

204. The terminal sends a beam measurement report to the network device, where the beam measurement report is used to indicate a measurement result of the quality of each resource.

In a conventional solution, the network device can determine, based on the measurement report, two specific beams used to simultaneously send signals to the terminal, and the terminal can receive the two beams. However, in a conventional solution, it cannot be ensured that the two selected beams respectively belong to two different TRPs. In other words, the two beams selected by the terminal may belong to a same TRP. Therefore, how to select beams from different TRPs to implement simultaneous multi-station data transmission is a problem to be resolved urgently.

Figure 3:
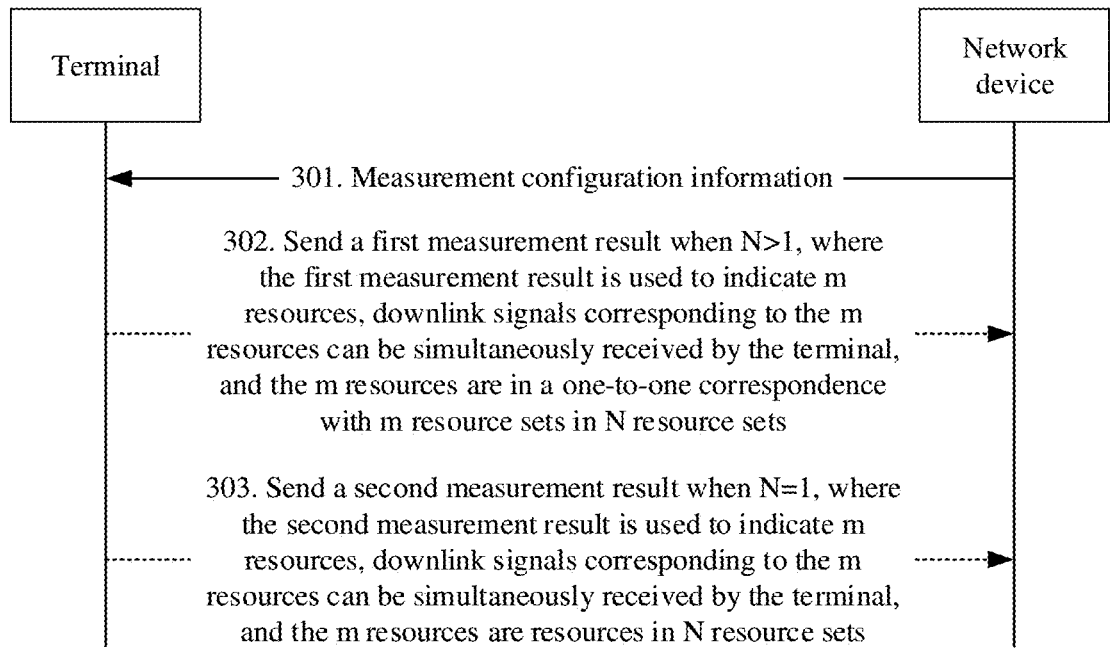
FIG. 3 is a schematic flowchart of a resource measurement method according to an embodiment of this application.

FIG. 3 is a schematic flowchart of a resource measurement method according to an embodiment of this application. It should be noted that steps 302 and 303 are two parallel steps, and are selectively performed according to conditions, and there is no sequence relationship between the two steps.

This embodiment of this application may be performed by a terminal or a network device, or a chip in the terminal or a chip in the network device. For ease of description, the following embodiment is described by using the terminal or the network device as an example. However, this application is not limited thereto.

301. The terminal receives measurement configuration information, where the measurement configuration information includes a first resource configuration and a first reporting configuration. The first reporting configuration is associated with the first resource configuration. The first resource configuration includes N resource sets, and each of the N resource sets includes one or more resources, where N≥1, and N is an integer. Correspondingly, the network device sends the measurement configuration information.

It may be further understood that the one or more resources may be resources corresponding to downlink beams of the network device.

It may be further understood that a resource type in this embodiment of this application may be a non-zero-power channel state information reference signal resource (NZP-CSI-RS-resource), or a synchronization signal and PBCH block (SSB), or may be a channel state information interference measurement (CSI-IM) resource.

Optionally, the N resource sets are in a one-to-one correspondence with N TRPs.

It may be understood that the correspondence between the N resource sets and the N TRPs may be agreed on in a protocol, or may be configured by the network device. This is not limited in this application. The network device may configure the correspondence explicitly or implicitly. For example, the network device may include a TRP association identifier in a resource set.

It may be further understood that the TRP association identifier may be an index of a TRP, or another identifier associated with a TRP. For example, the index of the TRP may be an identifier associated with a CORESET, for example, HigherLayerIndexPerCORESET. CORESETs belonging to different TRPs may be determined by using the identifier, or CORESETs may be grouped by using the identifier. Each group corresponds to one TRP. In other words, CORESETs with a same identifier are used as a group and correspond to a same TRP, and CORESETs with different identifiers correspond to different TRPs. The identifier may be directly carried in the CORESET. The identifier is used as the TRP association identifier.

Optionally, the TRP association identifier may alternatively be any one of the following: an index of a control resource set (CORESET), an index of a CORESET group, an index of a timing advance group (TAG), an index of a demodulation reference signal (DMRS) port, an index of a DMRS port group, an index for CORESET grouping, an index for generating a hybrid automatic repeat request (HARQ) codebook, a scrambling index (scrambling ID), an index of a beam failure recovery configuration, an index of a candidate beam resource group, an index of a candidate beam resource, an index of a physical uplink control channel (PUCCH) resource, an index of a PUCCH resource group, an index of a sounding reference signal (SRS) resource group, a slot index, or a subslot index.

302. The terminal sends a first measurement result to the network device when N>1, where the first measurement result is used to indicate m resources that can be simultaneously received by the terminal, that is, beams/downlink signals corresponding to the m resources can be simultaneously received by the terminal.

m=N, and the m resources are in a one-to-one correspondence with the N resource sets. That is, the to-be-determined quantity m of resources is equal to the quantity N of resource sets in the first resource configuration. The terminal selects one resource from each of the N resource sets, to form the m resources that can be simultaneously received by the terminal.

In other words, if the first resource configuration includes a plurality of resource sets, and group-based beam reporting in the first reporting configuration is configured as enabled, the terminal selects one or more resources from each of the plurality of resource sets, to form one or more groups of resources that can be simultaneously received by the terminal, and reports the one or more groups of resources to the network device. The quantity of reported resource groups may be configured by a network.

Further, when the N resource sets are in a one-to-one correspondence with the N TRPs, m=N resources determined by the terminal are from different TRPs, so that one beam is determined from each TRP, and the determined beams are used for simultaneous transmission, thereby enabling multi-station data transmission and improving communication efficiency.

It may be understood that the m channel resources are resources whose corresponding downlink signals can be simultaneously received by the terminal (for example, CSI-RS and/or SSB resources can be received simultaneously by the UE). In other words, the terminal can simultaneously receive signals sent on the m channel resources. Specifically, that the terminal can simultaneously receive signals sent on the m channel resources may mean: The terminal is capable of simultaneously receiving the downlink signals corresponding to the m channel resources, or the terminal is capable of simultaneously receiving transmit beams corresponding to the m channel resources. In other words, when the network device simultaneously sends downlink signals by using the transmit beams corresponding to the several channel resources, the terminal can receive all the downlink signals. For example, the transmit beams corresponding to the m channel resources all have a same receive beam, and the terminal can simultaneously receive, by using the receive beam, the downlink signals on the transmit beams corresponding to the m channel resources. For another example, the transmit beams corresponding to the m channel resources have different receive beams (it is assumed that the transmit beams correspond to X different receive beams in total). The terminal has a plurality of antenna panels, and can perform simultaneous receiving by using the X different receive beams. In this way, the terminal can also simultaneously receive the downlink signals on the transmit beams corresponding to the m channel resources.

Optionally, step 302 may be specifically sending the first measurement result to the network device when N>1 and the group-based beam reporting in the first reporting configuration is configured as enabled (for example, a groupBasedBeamReporting parameter is configured as enabled).

Optionally, m may alternatively be less than N. That is, the to-be-determined quantity m of resources is less than the quantity N of resource sets in the first resource configuration. To be specific, the terminal selects only one resource from each of some resource sets in the N resource sets, to form the m resources that can be simultaneously received by the terminal. For example, it is specified in the protocol that m=2, and N>2. The terminal selects one resource from each of two resource sets in the N resource sets, to form two resources that can be simultaneously received by the terminal, and reports information (such as indexes and RSRPs) of the selected resources to the network device.

Optionally, the terminal selects S (S≥1) resources from each of the N sets if N>1 and the grouping-based beam reporting parameter in the first reporting configuration is configured as disabled, where the resources are not required to be simultaneously received by the terminal, and reports information of the selected resources to the network device. Reporting results corresponding to resource sets are reported in a configuration order or an index order of the resource sets.

Optionally, in another implementation, m resources that can be simultaneously received by the terminal may be selected from each resource set. To be specific, if the first resource configuration includes a plurality of resource sets, and the group-based beam reporting in the first reporting configuration is configured as enabled, the terminal selects m resources from each of the plurality of resource sets, to form a plurality of resources that can be simultaneously received by the terminal, and reports information (such as indexes and RSRPs) of the selected resources to the network device.

Optionally, when the m resources that can be simultaneously received by the terminal cannot be selected according to the foregoing method, to be specific, when one resource cannot be selected from each of m resource sets to form the m resources that can be simultaneously received by the terminal, one resource is selected from each of the m resource sets to form the m resources, where the m resources are not required to be simultaneously received. The terminal reports information (such as indexes and RSRPs) of the selected resources to the network device. For example, one resource with optimal quality (for example, a resource with the largest RSRP) is selected from each of the m resource sets to form the m resources, and the m resources are reported to the network device.

Alternatively, when the m resources that can be simultaneously received by the terminal cannot be selected according to the foregoing method, to be specific, when one resource cannot be selected from each of the m resource sets to form the m resources that can be simultaneously received by the terminal, S resources are selected from the first resource configuration, and information (such as indexes and RSRPs) of the S resources is reported to the network device. For example, when the m resources that can be simultaneously received by the terminal cannot be selected according to the foregoing method, the terminal directly selects S resources with the largest RSRPs from the first resource configuration, and reports the S resources to the network device. A value of S may be specified in a protocol by default, or may be configured by the network device.

Alternatively, when the m resources that can be simultaneously received by the terminal cannot be selected according to the foregoing method, to be specific, when one resource cannot be selected from each of the m resource sets to form the m resources that can be simultaneously received by the terminal, S resources are selected from one resource set, and information (such as indexes and RSRPs) of the S resources is reported to the network device. The S resources can be simultaneously received by the terminal. To be specific, if one resource cannot be selected from each resource set to form the m resources that can be simultaneously received, S resources that can be simultaneously received are selected from one resource set. S may be equal to m, or may be another value. A value of S may be specified in a protocol by default, or may be configured by the network device.

Alternatively, when the m resources that can be simultaneously received by the terminal cannot be selected according to the foregoing method, to be specific, when one resource cannot be selected from each of the m resource sets to form the m resources that can be simultaneously received by the terminal, indexes and quality information of the m resources are reported to the network device. Quality of one or more resources in the m resources exceeds a range supported by the protocol. This is used to indicate, to the network device, that the m resources that can be simultaneously received cannot be selected.

303. The terminal sends a second measurement result to the network device when N=1 and if the group-based beam reporting in the first reporting configuration is configured as enabled (for example, the groupBasedBeamReporting parameter is configured as enabled), where the second measurement result is used to indicate the m resources that can be simultaneously received by the terminal. In other words, beams/downlink signals corresponding to the m resources can be simultaneously received by the terminal. The m resources are all selected from the N=1 resource set.

In other words, if the first resource configuration includes one resource set, and the group-based beam reporting in the first reporting configuration is configured as enabled, the terminal selects the m resources from the resource set, to form a plurality of resources that can be simultaneously received by the terminal.

Specifically, the terminal may detect a plurality of resources that can be simultaneously received. The plurality of resources are from a same resource set. In this way, the plurality of resources may correspond to a same TRP.

It may be understood that after performing step 301, if N 1, the terminal may directly perform step 303 without performing step 302.

It should be noted that the embodiment shown in FIG. 3 is described by using a group of resources that satisfy a co-receiving relationship as an example. In this embodiment of this application, the terminal may simultaneously select a plurality of groups of resources, where each group of resources have a co-receiving relationship.

The measurement result includes indexes of the resources determined according to the foregoing method, and may further include quality information and the like of these resources.

The resource set in the foregoing method may be a set of resources. To be specific, the first resource configuration resource configuration includes the N resource sets, and the terminal determines, from the N resource sets, the m resources that can be simultaneously received by the terminal.

Optionally, the N resource sets may be resource sets of a same cell, or may be resource sets of different cells. When the N resource sets are resource sets of different cells, one resource may be selected from each of a plurality of different cells to form the m resources that can be simultaneously received by the terminal. An identifier of a cell may be carried in a resource set, to indicate a cell to which each resource set belongs.

Optionally, in another implementation, the network device configures a first reporting configuration and N first resource configurations for the terminal, where the first reporting configuration is associated with the N first resource configurations. When N>1 and the group-based beam reporting in the first reporting configuration is configured as enabled, the terminal selects one resource from each of m (m≤N) resource configurations in the N resource configurations, to form the m resources that can be simultaneously received by the terminal. When N=1 and the group-based beam reporting in the first reporting configuration is configured as enabled, the terminal selects the m resources from the N=1 resource configuration, to form the m resources that can be simultaneously received by the terminal. The foregoing resource configuration resource configuration may alternatively be replaced with a resource setting, and the two are equivalent. The N first resource configurations may belong to a same cell, or may belong to different cells. When the N first resource configurations belong to different cells, one resource may be selected from each of a plurality of different cells, to form the m resources that can be simultaneously received by the terminal. A resource configuration may carry an identifier of a cell, to indicate a cell to which each resource configuration belongs.

The terminal may report, in the following reporting formats, one or more groups of resources that can be simultaneously received by the terminal. The one or more groups of resources that can be simultaneously received are a plurality of resource groups formed through pairing by selecting one or more resources from each of a plurality of resource sets. In other words, resources in each resource group belong to different resource sets. For example, O (O≥1) resources are selected from each of two resource sets, and are paired in a one-to-one manner to form O resource groups. Each resource group include two resources. Alternatively, a quantity of resources selected from each resource set is not limited to being equal to a quantity of resource groups. For example, two resources are selected from each of two resource sets, and four resource groups may be formed through pairing.

When information of one or more resource groups is reported, a reporting format includes indexes, RSRPs/SINRs, and the like of resources in each resource group. The following describes an example in which two resource groups are reported, and each resource group includes two resources (the two resources belong to two resource sets). It is assumed that resource #1 and resource #2 are two resources selected from the first resource set, and resource #a and resource #b are two resources selected from the second resource set. Resource #1 and resource #a form a resource group, and resource #2 and resource #b form a resource group. The indexes and the RSRPs/SINRs of the resources in each resource group may be arranged in the reporting format in any one of the following manners. The following method may be adaptively extended to a case in which a quantity of resource groups is not 2 and a quantity of resources in each resource group is not 2.

Manner 1: Arrange a group of resources first, and then arrange a next group of resources. For example, as shown in Table 1, resource #1 and resource #a in the first group are arranged first, and then resource #2 and resource #b in the second group are arranged. Specifically, the following several methods may be used for arranging resources in a same group and arranging different resource groups.

TABLE 1

| CSI report number | CSI arrangement order (fields) |
|---|---|
| CSI report #n | resource #1 |
|  | resource #a |
|  | resource #2 |
|  | resource #b |

The following methods can be used for arranging resource groups:

Method 1: Arrange resource groups in an order (for example, in descending order or in ascending order) of RSRPs/SINRs of resources with the largest RSRPs/SINRs in the resource groups (referred to as the largest RSRPs/SINRs in the resource group for short). For example, as shown in Table 1, the largest RSRP/SINR in the first resource group (resource #1 and resource #a) is greater than the largest RSRP/SINR in the second resource group (resource #2 and resource #b). Therefore, the first resource group is arranged before the second resource group. Alternatively, the resource groups do not have to be arranged in descending order or ascending order. It only needs to be ensured that a resource group with the largest RSRP/SINR in the resource groups is arranged in the first place.

The following methods are used to arrange resources in a same resource group.

Method A: Arrange resources in a configuration order or an index order of resource sets corresponding to the resources. For example, as shown in Table 1, resource #1 and resource #2 correspond to the first resource set, and resource #a and resource #b correspond to the second resource set. Therefore, resource #1 is arranged before resource #a, and resource #2 is arranged before resource #b.

Method B: Perform arrangement in an order (for example, in descending or ascending order) of RSRPs/SINRs. In an implementation, an arrangement order of resources in a resource group (for example, a resource group to be arranged first) is first determined in an order of RSRPs/SINRs. Because each resource in a resource group corresponds to one resource set, this method is equivalent to determining an arrangement order of resource sets corresponding to the resources. Then, an arrangement order of resources in another resource group is determined in the arrangement order of the resource sets. For example, an arrangement order of the resources in the first resource group is resource #1-resource #a, indicating that a resource set corresponding to resource #1 is arranged before a resource set corresponding to resource #a. Therefore, when the resources in the second resource group are arranged, resource #2 is arranged before resource #b, because resource #2 and resource #1 are from one resource set, and resource #b and resource #a are from one resource set.

Method 1 may be randomly combined with Method A and Method B.

RSRPs/SINRs corresponding to resources are arranged in an arrangement order of the resources. For example, in Table 1, if an arrangement order of the four resources is resource #1, resource #a, resource #2, and resource #b, RSRPs/SINRs of the four resources are also arranged in this order. In this way, the terminal can learn of an RSRP/SINR of each resource based on the arrangement.

Differential reporting may be used for the RSRP/SINR. The differential reporting may be classified into the following types:

Differential reporting manner 1: Perform differential reporting in each resource set. To be specific, a resource with the largest RSRP/SINR in each resource set is first determined, and the RSRP/SINR of the resource is directly reported. For another resource in the resource set, a difference between an RSRP/SINR of the another resource and the largest RSRP/SINR in the resource set corresponding to the another resource is reported.

Differential reporting manner 2: Perform differential reporting for all reported resources. To be specific, a resource with the largest RSRP/SINR in all reported resources (all resources selected from all resource sets) is first determined, and the RSRP/SINR of the resource is directly reported. For another resource, a difference between an RSRP/SINR of the another resource and the largest RSRP/SINR is reported. In other words, the differential reporting may be performed for resources in different resource sets.

Specific implementations or extension mechanisms of various differential reporting mechanisms in various arrangement manners are discussed in detail below. The following classification discussions are merely examples, and do not mean that the specific implementations or the extension mechanisms of the following differential reporting mechanisms are bound to corresponding arrangement manners.

Method 1+Method A:

Arrange resource groups in an order of the largest RSRPs/SINRs in the resource groups, and arrange resources in a resource group in a configuration order or an index order of corresponding resource sets. If differential reporting manner 1 is used (to be specific, differential reporting is performed for a resource in each resource set relative to a resource with the largest RSRP/SINR in the resource set), a position of the resource with the largest RSRP/SINR in the resource set cannot be determined by using the foregoing reporting format. In this case, the arrangement position corresponding to the resource with the largest RSRP/SINR in the resource set needs to be additionally reported. For example, if there are two resource sets, two pieces of position information need to be reported. The position information is about a relative position of a resource in a resource set. A length of a field indicating the position information is related to a quantity of reported resource groups. For example, a field length C=log 2(Y) is rounded up. Y is the quantity of reported resource groups. If differential reporting manner 2 is used (that is, differential reporting is performed for all resources relative to a resource with the largest RSRP/SINR), it may be determined that the resource with the largest RSRP/SINR is in the first resource group, but a specific position of the resource in the resource group is not determined. In other words, a resource set corresponding to the resource with the largest RSRP/SINR is not determined. In this case, a relative position of a resource with the largest RSRP/SINR in a resource group needs to be additionally reported, or information (such as an index) of a resource set corresponding to the resource with the largest RSRP/SINR needs to be additionally reported.

Method 1+Method B:

Arrange resource groups in an order of largest RSRPs/SINRs in the resource groups, and report resources in a resource group in an order of RSRPs/SINRs. For example, a resource with the largest RSRP/SINR is arranged in the first place in the resource group. It may be determined that a resource with the largest RSRP/SINR in all reported resources is arranged in the first place in the first resource group. If differential reporting manner 2 is used, an RSRP/SINR of the first resource is directly reported, and differential reporting is performed for an RSRP/SINR of each remaining resource and the RSRP/SINR of the first resource. A problem is that the network device cannot determine a specific resource set corresponding to the first resource arranged in the first resource group. Therefore, the resource set corresponding to the first resource in the first resource group further needs to be additionally reported, or a resource set corresponding to a resource located in the first place in the entire reporting format needs to be reported. A field length C=log 2(Y) used for reporting is rounded up. Y indicates a quantity of resource sets. Y can be fixed to 2. In this case, C=1. If differential reporting manner 1 is used, an arrangement position corresponding to a resource with the largest RSRP/SINR in each resource set does not need to be additionally reported.

Manner 2: First arrange resources in a same resource set, and then arrange resources in a next resource set. For example, as shown in Table 2, resource #1 and resource #2 that belong to the first resource set are first arranged, and then resource #a and resource #b that belong to the second resource set are arranged. Among a plurality of resources corresponding to resource sets, resources arranged in the first places form the first resource group, resources arranged in the second places form the second resource group, and so on.

TABLE 2

| CSI report number | CSI fields |
|---|---|
| CSI report #n | resource #1 |
| | resource #2 |
| | resource #a |
| | resource #b |

For determining an arrangement order of resource sets, and an arrangement order of resources belonging to a same resource set, the following methods are available.

For determining an arrangement order of resource sets, the following methods are available:

Method 1: Arrange resources in resource sets in a configuration order or an index order of the resource sets. For example, in Table 2, configuration of a resource set to which resource #1 and resource #2 belong is before that of a resource set to which resource #a and resource #b belong, or an index of a resource set to which resource #1 and resource #2 belong is less than that of a resource set to which resource #a and resource #b belong. Therefore, resource #1 and resource #2 are arranged before resource #a and resource #b.

Method 2: Arrange resource sets in an order (for example, in descending order or in ascending order) of largest RSRPs/SINRs of resources in the resource sets. For example, the largest RSRP/SINR of a resource in the first resource set (including resource #1 and resource #2) is greater than the largest RSRP/SINR of a resource in the second resource set (including resource #a and resource #b). Therefore, resource #1 and resource #2 are arranged before resource #a and resource #b.

For determining an arrangement order of resources in a same resource set, the following method is available.

For determining an arrangement order of a plurality of resources in resource sets, an arrangement order of resources in one resource set (for example, the first resource set that is arranged) is first determined (equivalent to determining an arrangement order of resource groups to which the resources belong), and then an arrangement order of resources in another resource set is determined in the arrangement order of the resource groups. For example, an arrangement order of resources in the first resource set is resource #1-resource

2, indicating that a resource group corresponding to resource #1 is arranged before a resource group corresponding to resource #2. Therefore, during arrangement of resources in the second resource set, resource #a is arranged before resource #b, because resource #a and resource #1 are from one resource group, and resource #b and resource #2 are from one resource group. For how to first determine an arrangement order of resources in a resource set, the following methods may be available.

Method A: Arrange resources in a configuration order or an index order of the resources.

Method B: Arrange resources in an order (for example, in descending or ascending order) of RSRPs/SINRs. Alternatively, the resources do not need to be strictly arranged in descending order or ascending order, and it only needs to be ensured that a resource with the largest RSRP/SINR is arranged in the first place in the resource set.

Method 1 and Method 2 may be randomly combined with Method A and Method B.

RSRPs/SINRs corresponding to resources are arranged in an arrangement order of the resources. For example, in Table 2, if an arrangement order of the four resources is resource #1, resource #2, resource #a, and resource #b, RSRPs/SINRs of the four resources are also arranged in this order. In this way, the terminal can learn of an RSRP/SINR of each resource based on the arrangement.

Differential reporting may be used for the RSRP/SINR. The differential reporting may be classified into the following types:

Differential reporting manner 1: Perform differential reporting in each resource set. To be specific, a resource with the largest RSRP/SINR in each resource set is first determined, and the RSRP/SINR of the resource is directly reported. For another resource in the resource set, a difference between an RSRP/SINR of the another resource and the largest RSRP/SINR in the resource set corresponding to the another resource is reported.

Differential reporting manner 2: Perform differential reporting for all reported resources. To be specific, a resource with the largest RSRP/SINR in all reported resources (all resources selected from all resource sets) is first determined, and the RSRP/SINR of the resource is directly reported. For another resource, a difference between an RSRP/SINR of the another resource and the largest RSRP/SINR is reported. In other words, the differential reporting may be performed for resources in different resource sets.

Specific implementations or extension mechanisms of various differential reporting mechanisms in various arrangement manners are discussed in detail below. The following classification discussions are merely examples, and do not mean that the specific implementations or the extension mechanisms of the following differential reporting mechanisms are bound to corresponding arrangement manners.

Method 1+Method A:

An arrangement order of resource sets and an arrangement order of resources in a resource set follow a configuration order or an index order. In this case, an arrangement position of a resource with the largest RSRP/SINR in each resource set cannot be determined, and an arrangement position of a resource with the largest RSRP/SINR in all resources cannot be determined. If differential reporting manner 1 is used, an arrangement position corresponding to a resource with the largest RSRP/SINR in each resource set needs to be additionally reported. For example, if there are two resource sets, two pieces of position information need to be reported. The position information is about a relative position of a resource in a resource set. A length of a field indicating the position information is related to a quantity of reported resource groups. For example, a field length $C=\log 2(Y)$ is rounded up. Y is the quantity of reported resource groups. If differential reporting manner 2 is used, an arrangement position corresponding to a resource with the largest RSRP/SINR in all resources needs to be additionally reported. A relative position of the resource in all the resources may be directly reported. A field length $C=\log 2(Y)$ is rounded up. Y is a total quantity of resources (obtained by multiplying a quantity of resource groups by a quantity of resources in each group). Alternatively, a resource set corresponding to the resource (a field length $C=\log 2(Y)$ is rounded up, and Y is a quantity of resource sets) and a relative position of the resource in the resource set (a field length $C=\log 2(Y)$ is rounded up, and Y is a quantity of reported resource groups) may be separately reported.

Method 1+Method B:

Arrange resource sets in a configuration order or an index order, and arrange resources in a resource set in an order of RSRPs/SINRs. An arrangement position of a resource with the largest RSRP/SINR in each resource set may be determined, but which resource set has a greater RSRP/SINR cannot be determined. To be specific, an arrangement position of a resource with the largest RSRP/SINR in all resources cannot be determined. If differential reporting manner 1 is used, an arrangement position corresponding to a resource with the largest RSRP/SINR in each resource set does not need to be additionally reported. If differential reporting manner 2 is used, a resource set in which a resource with the largest RSRP/SINR in all reported resources is located needs to be additionally reported. A field length $C=\log 2(Y)$ used for reporting is rounded up. Y indicates a quantity of resource sets. Y can be fixed to 2. In this case, C=1.

Method 2+Method A:

Arrange resource sets in an order of largest RSRPs/SINRs in the sets, and arrange resources in a resource set in a configuration order or an index order of the resources. A resource set in which a resource with the largest RSRP/SINR in all resources is located can be determined, but a specific arrangement position of the resource in the resource set cannot be determined, and a position of a resource with the largest RSRP/SINR in each resource set cannot be determined. If differential reporting manner 1 is used, an arrangement position corresponding to a resource with the largest RSRP/SINR in each resource set needs to be additionally reported. For example, if there are two resource sets, two pieces of position information need to be reported. The position information is about a relative position of a resource in a resource set. A length of a field indicating the position information is related to a quantity of reported resource groups. For example, a field length $C=\log 2(Y)$ is rounded up. Y is the quantity of reported resource groups. If differential reporting manner 2 is used, an arrangement position corresponding to a resource with the largest RSRP/SINR in all resources needs to be additionally reported. A relative position of the resource in all the resources may be directly reported. A field length $C=\log 2(Y)$ is rounded up. Y is a total quantity of resources (obtained by multiplying a quantity of resource groups by a quantity of resources in each group). Alternatively, only a position of the resource in a resource set corresponding to the resource may be reported (a field length $C=\log 2(Y)$ is rounded up, and Y is a quantity of reported resource groups). In addition, when resource sets are arranged in an order of RSRPs/SINRs, the network device cannot determine an index of a resource set arranged at each position, for example, an index of a resource set arranged in the first place. Therefore, the index of the resource set arranged at each position further needs to be additionally reported. Alternatively, an index of only one resource set may be reported, for example, an index of a resource set arranged in the first place, or an index of a resource set corresponding to a resource with the largest RSRP/SINR. The latter method may be used in a case in which there are only two resource sets.

Method 2+Method B:

Arrange resource sets in an order of largest RSRPs/SINRs in the sets, and arrange resources in a resource set in an order of RSRPs/SINRs. A position of a resource with the largest RSRP/SINR in all resources may be determined, or a position of a resource with the largest RSRP/SINR in each resource set may be determined. Position information does not need to be reported. In addition, when resource sets are arranged in an order of RSRPs/SINRs, the network device cannot determine an index of a resource set arranged at each position, for example, an index of a resource set arranged in the first place. Therefore, the index of the resource set arranged at each position further needs to be additionally reported. Alternatively, an index of only one resource set may be reported, for example, an index of a resource set arranged in the first place, or an index of a resource set corresponding to a resource with the largest RSRP/SINR. The latter method may be used in a case in which there are only two resource sets.

Further, an arrangement position of a resource with the largest RSRP/SINR in each resource group, information of the corresponding resource group, or information of a corresponding resource set may be reported; an arrangement position of a resource with the largest RSRP/SINR in each resource set, information of a corresponding resource group, or information of the corresponding resource set may be reported; or a relative arrangement position of a resource with the largest RSRP/SINR in all reported resources, information of a corresponding resource group, or information of a corresponding resource set may be reported. The information of the resource group and the information of the resource set may be index information.

In the foregoing reporting format, resources at a plurality of arrangement positions may be the same. To be specific, when a same resource is used to be paired with different resources to form a plurality of resource groups, the same resource appears at a plurality of positions in the reporting format. For example, in Table 3, resource #1 in the first resource set separately forms two resource groups: (resource #1 and resource #a) and (resource #1 and resource #b) with resource #a and resource #b in the second resource set. In the following reporting format, resource #1 appears in both resource groups.

TABLE 3

| CSI report number | CSI fields |
| --- | --- |
| CSI report #n | resource #1 |
| | resource #a |
| | resource #1 |
| | resource #b |

In the foregoing method, a resource set may be replaced with a resource setting or a resource set in another form.

Figure 4:
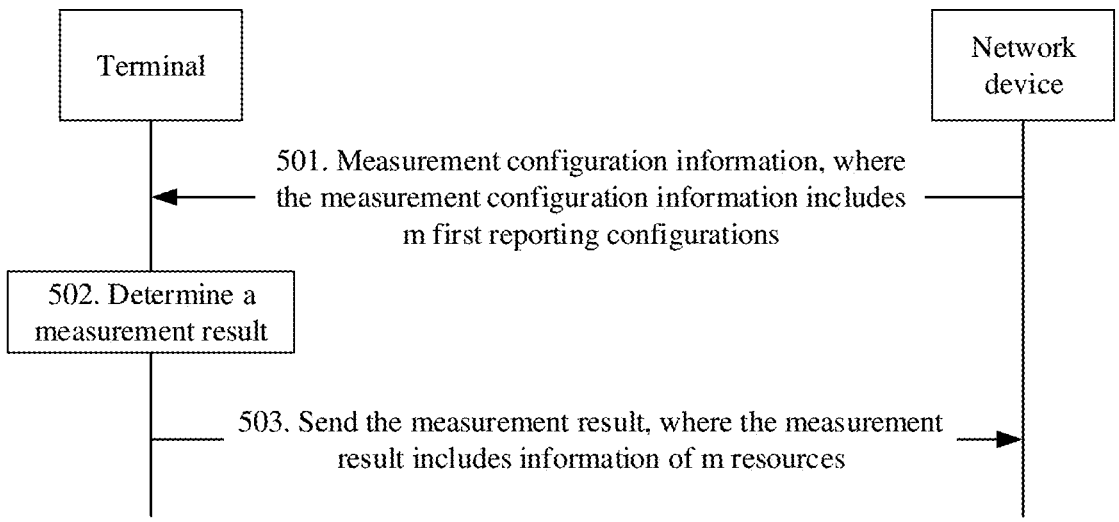
FIG. 4 is a schematic flowchart of a resource measurement method according to another embodiment of this application.

FIG. 4 is a schematic flowchart of a resource measurement method according to another embodiment of this application.

This embodiment of this application may be performed by a terminal or a network device, or a chip in the terminal or a chip in the network device. For ease of description, the following embodiment is described by using the terminal or the network device as an example. However, this application is not limited thereto.

501. The terminal receives measurement configuration information, where the measurement configuration information includes m first reporting configurations, m≥2, and m is a positive integer. In other words, the network device configures the m first reporting configurations for the terminal. The m first reporting configurations may be configured by using one piece of measurement configuration information, or may be configured by using a plurality of pieces of measurement configuration information.

Each first reporting configuration is associated with one or more resource configurations.

The m first reporting configurations may belong to a same cell, or may belong to different cells.

The m first reporting configurations have an association relationship with each other. The association relationship is used to indicate that resources reported based on the m first reporting configurations should satisfy a co-receiving relationship. In other words, the resources reported based on the m first reporting configurations can be simultaneously received by the terminal. For example, the terminal reports one resource based on each of the m first reporting configurations, and these resources can be simultaneously received by the terminal. To be specific, the terminal reports one resource based on each of the m first reporting configurations, to form m resources that can be simultaneously received by the terminal. One first reporting configuration may carry an index of another first reporting configuration, to establish the association relationship. For example, a group-based beam reporting parameter groupBasedBeamReporting of a first reporting configuration carries an index of another first reporting configuration. Alternatively, a first reporting configuration may carry an index of another first reporting configuration and a cell to which the another first reporting configuration belongs, to establish the association relationship. For example, a group-based beam reporting parameter groupBasedBeamReporting of a first reporting configuration carries an index of another first reporting configuration and an identifier of a cell to which the another first reporting configuration belongs, to associate first reporting configurations of different cells.

502. Determine a measurement result. The terminal selects, based on the association relationship, one resource from each of resource configurations corresponding to the m first reporting configurations, to form the m resources that can be simultaneously received by the terminal.

To be specific, if the m configured first reporting configurations have an association relationship with each other, the terminal selects one resource from each of resource configurations corresponding to the m first reporting configurations, to form the m resources that can be simultaneously received by the terminal.

503. The terminal sends the measurement result to the network device. The measurement result includes information of the m resources, for example, indexes or quality of the resources. The measurement result may be reported based on one reporting configuration. That is, the information of the m resources is reported to the network device based on one of the m first reporting configurations. The measurement result may be reported based on m reporting configurations. To be specific, information of each of the m resources is reported based on the m first reporting configurations. To be specific, one resource is reported based on each first reporting configuration, and the resource is a resource selected from a resource configuration corresponding to the first reporting configuration.

Specifically, when the m configured reporting configurations have an association relationship with each other, the terminal selects one resource from each of resource configurations corresponding to the m reporting configurations, to form the m resources that can be simultaneously received by the terminal. This helps the terminal simultaneously transmit data with a plurality of TRPs when resource configurations associated with the m reporting configurations correspond to different TRPs.

Optionally, that the terminal sends m measurement results by using the m reporting configurations may be: The terminal sends the m measurement results when the m reporting configurations satisfy at least one of the following conditions: some or all of group-based beam reporting parameters in the m reporting configurations are configured as enabled; and the m reporting configurations have an association relationship with each other.

Specifically, each of the m measurement results is used to indicate any one of the m resources.

If the terminal detects that group-based reporting parameters in all of the m reporting configurations are configured as enabled, the terminal may report the m reporting configurations based on the m measurement results.

Alternatively, if the terminal detects that group-based reporting parameters in some of the m reporting configurations (that is, one of the m reporting configurations, or a plurality of reporting configurations less than the m reporting configurations) are configured as enabled, the terminal may report the m reporting configurations based on the m measurement results.

Alternatively, the terminal detects that the m reporting configurations have an association relationship with each other, and the terminal may report the m reporting configurations based on the m measurement results. To be specific, the terminal may select one resource from each resource set in the measurement configuration information to which the reporting configurations that have an association relationship belong, to obtain the m resources whose corresponding downlink signals can be simultaneously received by the terminal.

It may be understood that the terminal may report the m measurement results by using the m reporting configurations only when group-based reporting parameters in some of the m reporting configurations are configured as enabled, and the m reporting configurations have an association relationship with each other. Alternatively, the terminal may report the m measurement results by using the m reporting configurations only when group-based reporting parameters in all of the m reporting configurations are configured as enabled, and the m reporting configurations have an association relationship with each other.

Figure 5:
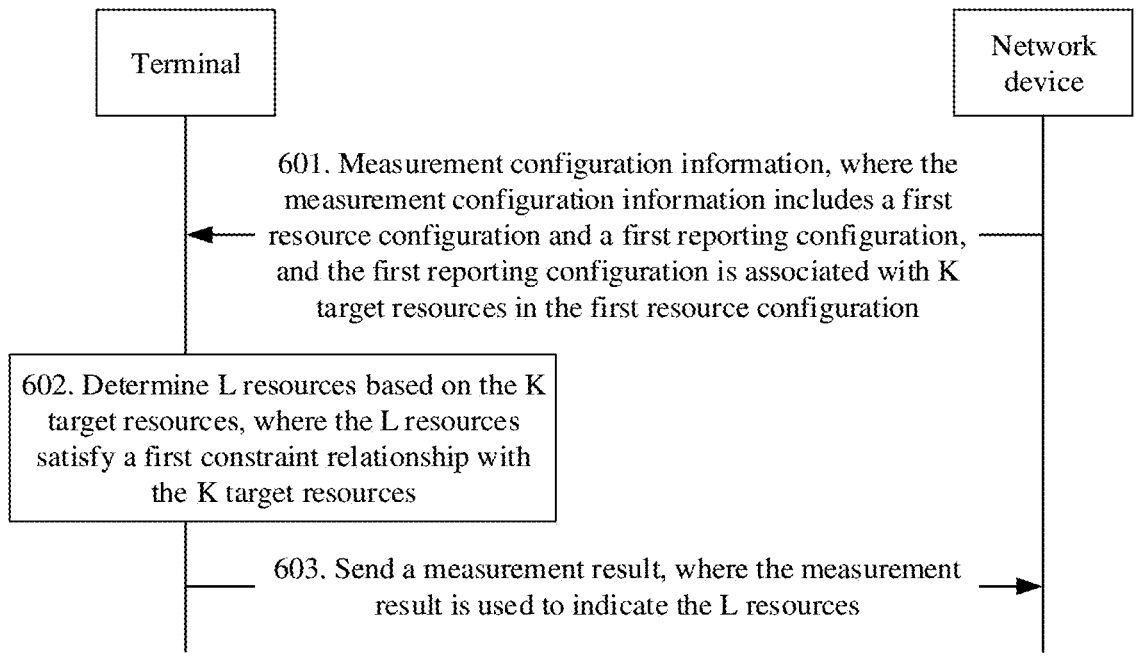
FIG. 5 is a schematic flowchart of a resource measurement method according to another embodiment of this application.

FIG. 5 is a schematic flowchart of a resource measurement method according to another embodiment of this application.

This embodiment of this application may be performed by a terminal or a network device, or a chip in the terminal or a chip in the network device. For ease of description, the following embodiment is described by using the terminal or the network device as an example. However, this application is not limited thereto.

It should be noted that, unless otherwise particularly specified, same terms in the embodiment shown in FIG. 5 and the embodiment shown in FIG. 3 indicate same meanings. To avoid repetition, details are not described herein again.

601. The terminal receives measurement configuration information, where the measurement configuration information includes a first resource configuration and a first reporting configuration, and the first reporting configuration is associated with K target resources in the first resource configuration.

The first reporting configuration is associated with the K target resources, and K is an integer greater than or equal to 1. It indicates that a resource reported based on the first reporting configuration and the K target resources need to satisfy a co-receiving relationship. In other words, the resource reported based on the first reporting configuration and the K target resources can be simultaneously received by the terminal. The first reporting configuration may carry indexes of the K target resources, to establish the association relationship. For example, a group-based beam reporting parameter groupBasedBeamReporting in the first reporting configuration carries the indexes of the K target resources, to establish the association relationship. The K target resources and the first reporting configuration may belong to a same cell, or may belong to different cells. When the K target resources are resources of another cell (where the K target resources and the first reporting configuration do not belong to a same cell), the first reporting configuration may further carry an identifier of a cell of the K target resources. For example, the group-based beam reporting parameter groupBasedBeamReporting in the first reporting configuration carries the identifier of the cell of the K target resources, to establish the association relationship.

Optionally, the association relationship may alternatively be established by using the first resource configuration. To be specific, that the first resource configuration is associated with the K target resources indicates that resources selected from the first resource configuration and the K target resources need to satisfy a co-receiving relationship. In other words, the resources selected from the first resource configuration and the K target resources can be simultaneously received by the terminal. In other words, a resource reported based on a reporting configuration associated with the first resource configuration and the K target resources can be simultaneously received by the terminal. The first resource configuration may carry the indexes of the K target resources, to establish the association relationship. Alternatively, resource sets or resources included in the first resource configuration may carry the indexes of the K target resources, to establish the association relationship. If the K target resources and the first resource configuration belong to different cells, the first resource configuration (or the resource sets or the resources included in the first resource configuration) may further carry an identifier of a cell to which the K target resources belong.

The target resource in the foregoing method may be an NZP CSI-RS resource, a CSI-IM resource, a ZP CSI-RS resource, a time-frequency tracking CSI-RS (TRS) resource, a phase tracking CSI-RS (PTRS) resource, an SSB resource, or the like. Alternatively, the target resource may be an uplink reference signal resource, for example, a sounding reference signal (SRS). When the target resource is an uplink resource, it indicates that a resource reported in this measurement can be received by using a transmit beam of the uplink resource. In other words, a transmit beam of the uplink resource can be used to receive a resource reported in this measurement.

602. The terminal determines L resources based on the K target resources, where the L resources and the K target resources satisfy a first constraint relationship.

Specifically, the terminal determines one or more to-be-reported resources based on the association relationship and associated objects. For example, one or more resources are determined, where the one or more resources and the target resource can be simultaneously received by the terminal. The resource (namely, the L resources) reported in this measurement is a resource reported based on the first reporting configuration.

Optionally, the K target resources in the foregoing method may alternatively be replaced with target reporting configurations, to indicate that the resource reported in this measurement and resources reported based on the K target reporting configurations can be simultaneously received by the terminal. When the target reporting configuration and the first resource configuration or the first reporting configuration do not belong to a same cell, an index of a cell to which the target reporting configuration belongs further needs to be specified. For example, the index of the cell to which the target reporting configuration belongs is specified in the first resource configuration or the first reporting configuration.

Optionally, the K target resources in the foregoing method may alternatively be replaced with target resource sets, target resource configurations, or resource settings, indicating that the resource reported in this measurement and the resources determined from the K target resource sets/resource settings/resource configurations can be simultaneously received by the terminal. When the target resource set/resource setting/resource configuration and the first resource configuration or the first reporting configuration do not belong to a same cell, an index of a cell to which the target resource set/resource setting/resource configuration belongs further needs to be specified. For example, the index of the cell to which the target resource set/resource setting/resource configuration belongs is specified in the first resource configuration or the first reporting configuration.

Optionally, the K target resources in the foregoing method may alternatively be replaced with target channels, indicating that a resource reported in this measurement can be received by using a receive beam of the target channels, or indicating that a resource reported in this measurement and the target channels can be simultaneously received by the terminal. For example, if a receive beam of a target channel is beam 1, and a target channel of a resource reported in this measurement is also beam 1, the resource reported in this measurement and the target channel can be simultaneously received by the terminal. For another example, if a receive beam of a target channel is beam 1, a target channel of a resource reported in this measurement is beam 5, beam 1 and beam 5 are respectively located on two antenna panels of the terminal, and the terminal can simultaneously generate beam 1 and beam 5 by using the two antenna panels, the resource reported in this measurement and the target channel can be simultaneously received by the terminal. The target channel may be a physical downlink control channel (PDCCH), a physical downlink shared channel (PDSCH), a broadcast channel (PBCH), or the like. Alternatively, the target channel may be an uplink channel, such as a physical uplink control channel (PUCCH), a physical uplink shared channel (PUSCH), a physical random access channel (PRACH), or the like. When the target channel is an uplink channel, it indicates that a resource reported in this measurement can be received by using a transmit beam of the uplink channel. In other words, a transmit beam of the uplink channel can be used to receive a resource reported in this measurement.

Optionally, in the foregoing method, the K target resources may alternatively be replaced with an index of an antenna panel, to indicate that a resource reported in this measurement is received by using the antenna panel. Alternatively, it indicates that a resource reported in this measurement is received by using an antenna panel other than the antenna panel.

In the foregoing method, the association relationship indicates that a plurality of reported resources can be simultaneously received by the terminal. There may be another association relationship in addition to the association relationship. For example, in an association relationship, a same receive beam is used. To be specific, a resource reported in this measurement and the target resource or the target channel have a same receive beam; or a resource reported in this measurement and a resource reported based on a target reporting configuration have a same receive beam. Alternatively, a resource reported in this measurement and a resource reported based on a reporting configuration corresponding to the target resource configuration have a same receive beam.

In the foregoing method, the association relationship may further indicate that different receive antenna panels are used. To be specific, a receive beam of a resource reported in this measurement and a receive beam of a target resource or a target channel are located on different antenna panels. In other words, the terminal may use different antenna panels to receive the resource reported in this measurement and the target resource or the target channel. Alternatively, a receive beam of a resource reported in this measurement and a receive beam of a resource reported based on a target reporting configuration are located on different antenna panels. In other words, the terminal may use different antenna panels to receive the resource reported in this measurement and the resource reported based on the target reporting configuration. Alternatively, a receive beam of a resource reported in this measurement and a receive beam of a resource reported based on a reporting configuration corresponding to a target resource configuration are located on different antenna panels. In other words, the terminal may use different antenna panels to receive the resource reported in this measurement and the resource reported based on the reporting configuration corresponding to the target resource configuration.

In the foregoing method, the association relationship may further indicate that a correlation is higher than or lower than a threshold, and the correlation is highest or lowest. To be specific, a correlation between a resource reported in this measurement and a target resource is higher than or lower than a threshold, or a correlation between a resource reported in this measurement and a target resource is highest or lowest.

In the foregoing method, the association relationship may further indicate that a quality difference is greater than or less than a threshold. To be specific, a quality difference (for example, an RSRP difference) between a resource reported in this measurement and a target resource needs to be greater than or less than a threshold.

603. Report a measurement result. The measurement result is used to indicate the L resources. For example, the measurement result includes an index of a resource and quality (such as an RSRP, an SINR, or a CQI) of the resource.

It may be understood that, in the foregoing method embodiments, the methods and the operations implemented by the terminal may alternatively be implemented by a component (for example, a chip or a circuit) used in the terminal, and the methods and the operations implemented by the network device may alternatively be implemented by a component (for example, a chip or a circuit) used in the network device.

The foregoing mainly describes the solutions provided in embodiments of this application from a perspective of interaction. It may be understood that, to implement the foregoing functions, the network elements, such as the terminal or the network device, include a corresponding hardware structure and/or software module for performing each function. A person skilled in the art may be aware that, with reference to the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, functional modules of the terminal or the network device may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that the module division in embodiments of this application is an example and is only logical function division. There may be other division manner in actual implementation. An example in which each functional module is obtained through division based on a corresponding function is used below for description.

It should be understood that specific examples in embodiments of this application are merely intended to help persons skilled in the art better understand embodiments of this application, rather than limit the scope of embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The methods provided in embodiments of this application are described above in detail with reference to FIG. 3 to FIG. 5. Apparatuses provided in embodiments of this application are described in detail below with reference to FIG. 6 to FIG. 13. It should be understood that descriptions of the apparatus embodiments correspond to the descriptions of the method embodiments. Therefore, for content not described in detail, refer to the foregoing method embodiments. For brevity, details are not described herein again.

Figure 6:
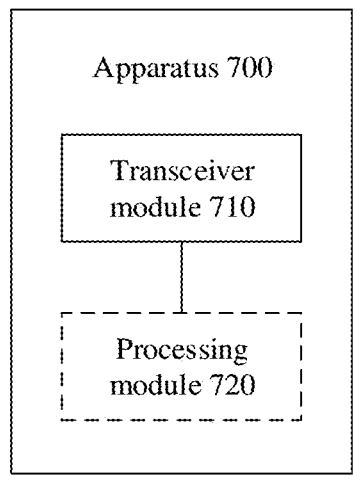
FIG. 6 is a schematic block diagram of a resource measurement apparatus according to an embodiment of this application.

FIG. 6 is a schematic block diagram of a resource measurement apparatus 700 according to an embodiment of this application.

It should be understood that the apparatus 700 may correspond to each terminal shown in FIG. 1 or a chip in the terminal, and the terminal in the embodiment shown in FIG. 1 or the chip in the terminal may have any function of the terminal in the method embodiment shown in FIG. 1. The apparatus 700 includes a transceiver module 710.

The transceiver module 710 is configured to receive measurement configuration information, where the measurement configuration information includes N resource sets, and each of the N resource sets includes one or more resources, where N≥1, and N is an integer.

The transceiver module 710 is further configured to send a first measurement result to a network device when N>1, where the first measurement result is used to indicate m resources, downlink signals corresponding to the m resources can be simultaneously received by a terminal, and the m resources are in a one-to-one correspondence with m resource sets in the N resource sets, where m≥2, and m is an integer.

The transceiver module 710 is further configured to send a second measurement result to a network device when N=1, where the second measurement result is used to indicate m resources, downlink signals corresponding to the m resources can be simultaneously received by a terminal, and the m resources are resources in the N resource sets.

Optionally, the apparatus 700 may further include a processing module 720. The processing module 720 is configured to determine the m resources from the N resource sets.

Optionally, the N resource sets are in a one-to-one correspondence with N TRPs.

Optionally, the transceiver module 710 is specifically configured to send the first measurement result to the network device when N>1 and a group-based beam reporting parameter in the measurement configuration information indicates enabled.

For more detailed descriptions of the transceiver module 710 and the processing module 720, refer to related descriptions in the foregoing method embodiments. Details are not described herein again.

In another possible implementation, the transceiver module 710 may be configured to report K resource groups, where each of the K resource groups includes L resources, the L resources respectively belong to L different resource sets, and the resource set includes one or more of the following: a resource set and a resource setting, where K≥1 and L≥1.

Optionally, the transceiver module 710 is specifically configured to report the K resource groups in a first reporting format or a second reporting format.

Optionally, the first reporting format includes: consecutively arranging resources belonging to a same resource group, and sequentially arranging the K resource groups; arranging the K resource groups in a first order; and arranging resources in each resource group in a second order.

Optionally, the first order includes: an order of first RSRPs/SINRs, where the first RSRP/SINR is an RSRP/SINR of a resource with the largest RSRP/SINR in a resource group.

Optionally, the second order includes: a configuration order of resource sets corresponding to resources in each resource group; an index order of resource sets corresponding to resources in each resource group; or an RSRP/SINR order of resources in each resource group.

Optionally, the first reporting format further includes one or more of the following: an arrangement position of a first resource in each of the L resource sets, or information of a resource group corresponding to the first resource, where the first resource is a reported resource with the largest RSRP/

SINR in each resource set; a relative arrangement position of a resource with the largest RSRP/SINR in all resources in the K resource groups; information of a resource group corresponding to a resource with the largest RSRP/SINR in the K resource groups; and information of a resource set corresponding to a resource with the largest RSRP/SINR in the K resource groups.

Optionally, the second reporting format includes: consecutively arranging resources belonging to a same resource set, and sequentially arranging the L resource sets; arranging the L resource sets in a third order; and arranging resources in each resource set in a fourth order.

Optionally, the third order includes: a configuration order of resource sets; an index order of resource sets; or an order of second RSRPs/SINRs, where the second RSRP/SINR is an RSRP/SINR of a resource with the largest RSRP/SINR in a resource set.

Optionally, the fourth order includes a configuration order of resources, an index order of resources, or an RSRP/SINR order of resources.

Optionally, the second reporting format further includes one or more of the following: an arrangement position of a second resource in each of the K resource groups, or information of a resource group corresponding to the second resource, where the second resource is a reported resource with the largest RSRP/SINR in each resource group; a relative arrangement position of a resource with the largest RSRP/SINR in all resources in the K resource groups; information of a resource group corresponding to a resource with the largest RSRP/SINR in the K resource groups; and information of a resource set corresponding to a resource with the largest RSRP/SINR in the K resource groups.

Optionally, the transceiver module 710 may be further configured to report an RSRP/SINR corresponding to each resource in the K resource groups, where an arrangement order of RSRPs/SINRs is the same as an arrangement order of corresponding resources.

Optionally, the transceiver module 710 may be specifically configured to report the RSRP/SINR of each resource in the K resource groups in a first differential reporting criterion or a second differential reporting criterion, where the first differential reporting criterion includes: reporting an RSRP/SINR of a resource with the largest RSRP/SINR in each resource set, and reporting an RSRP/SINR difference between each resource other than the resource with the largest RSRP/SINR in the resource set and the resource with the largest RSRP/SINR; and the second differential reporting criterion includes: reporting an RSRP/SINR of a resource with the largest RSRP/SINR in the K resource groups, and reporting an RSRP/SINR difference between each resource other than the resource with the largest RSRP/SINR in the K resource groups and the resource with the largest RSRP/SINR.

Figure 7:
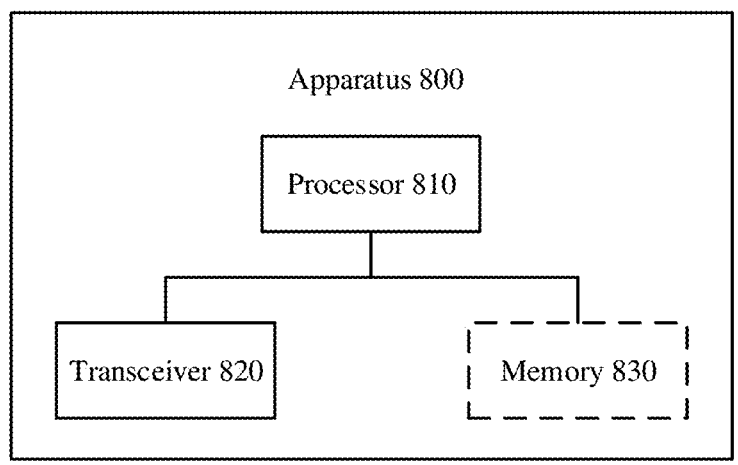
FIG. 7 is a schematic structural diagram of a resource measurement apparatus according to an embodiment of this application.

FIG. 7 shows a resource measurement apparatus 800 according to an embodiment of this application. The apparatus 800 may be the terminal in FIG. 1. The apparatus may use a hardware architecture shown in FIG. 7. The apparatus may include a processor 810 and a transceiver 820. Optionally, the apparatus may further include a memory 830. The processor 810, the transceiver 820, and the memory 830 communicate with each other through an internal connection path. A related function implemented by the processing module 720 in FIG. 6 may be implemented by the processor 810. A related function implemented by the transceiver module 710 may be implemented by the processor 810 by controlling the transceiver 820.

Optionally, the processor 810 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data, and the central processing unit may be configured to: control a resource measurement apparatus (for example, a base station, a terminal, or a chip), execute a software program, and process data of the software program.

Optionally, the processor 810 may include one or more processors, for example, include one or more central processing units (CPUs). When the processor is one CPU, the CPU may be a single-core CPU, or may be a multi-core CPU.

The transceiver 820 is configured to send and receive data and/or a signal, and receive data and/or a signal. The transceiver may include a transmitter and a receiver. The transmitter is configured to send data and/or a signal, and the receiver is configured to receive data and/or a signal.

The memory 830 includes but is not limited to a random access memory (RAM), a read-only memory (ROM), an erasable programmable read-only memory (EPROM), and a compact disc read-only memory (CD-ROM). The memory 830 is configured to store related instructions and data.

The memory 830 is configured to store program code and data of the terminal, and may be an independent device or integrated into the processor 810.

Specifically, the processor 810 is configured to control the transceiver to perform information transmission with the terminal. For details, refer to the descriptions in the method embodiment, and details are not described herein again.

During specific implementation, in an embodiment, the apparatus 800 may further include an output device and an input device. The output device communicates with the processor 810, and may display information in a plurality of manners. For example, the output device may be a liquid crystal display (LCD), a light emitting diode (LED) display device, a cathode ray tube (CRT) display device, a projector, or the like. When communicating with the processor 810, the input device may receive an input from a user in a plurality of manners. For example, the input device may be a mouse, a keyboard, a touchscreen device, or a sensing device.

It may be understood that FIG. 7 shows only a simplified design of the resource measurement apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 800 may be a chip, for example, may be a communication chip applicable to the terminal, and configured to implement a related function of the processor 810 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

An embodiment of this application further provides an apparatus. The apparatus may be a terminal or a circuit. The apparatus may be configured to perform an action performed by the terminal in the foregoing method embodiments.

Figure 8:
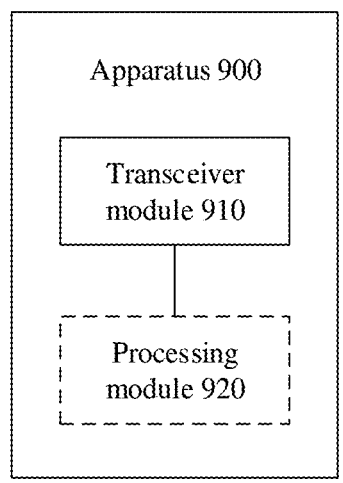
FIG. 8 is a schematic block diagram of a resource measurement apparatus according to another embodiment of this application.

FIG. 8 is a schematic block diagram of a resource measurement apparatus 900 according to an embodiment of this application.

It should be understood that the apparatus 900 may correspond to the network device shown in FIG. 1 or a chip in the network device, or the network device in the embodiment shown in FIG. 1 or a chip in the network device, and may have any function of the network device in the method. The apparatus 900 includes a transceiver module 910.

The transceiver module 910 is configured to send measurement configuration information, where the measurement configuration information includes N resource sets, and each of the N resource sets includes one or more resources, where N≥1, and N is an integer.

The transceiver module 910 is further configured to receive a first measurement result, where the first measurement result is used to indicate m resources, downlink signals corresponding to the m resources can be simultaneously received by a terminal, and the m resources are in a one-to-one correspondence with m resource sets in the N resource sets, where m≥2, and m is an integer.

The transceiver module 910 is further configured to receive a second measurement result, where the second measurement result is used to indicate m resources, downlink signals corresponding to the m resources can be simultaneously received by a terminal, and the m resources are resources in the N resource sets.

Optionally, the apparatus 900 further includes a processing module 920. The processing module 920 may be configured to determine the measurement configuration information.

Optionally, the N resource sets are in a one-to-one correspondence with N TRPs.

Figure 9:
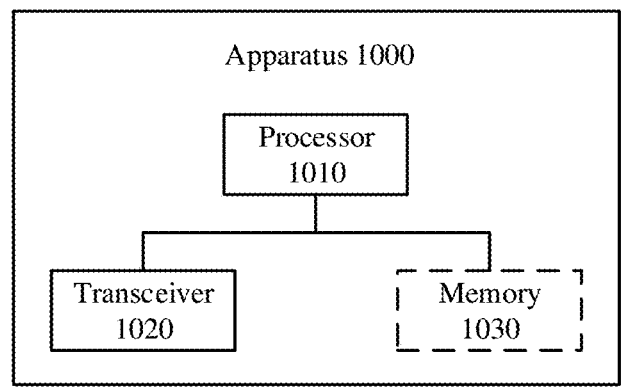
FIG. 9 is a schematic structural diagram of a resource measurement apparatus according to an embodiment of this application.

FIG. 9 shows a resource measurement apparatus 1000 according to an embodiment of this application. The apparatus 1000 may be the network device in FIG. 1. The apparatus may use a hardware architecture shown in FIG. 9. The apparatus may include a processor 1010 and a transceiver 1020. Optionally, the apparatus may further include a memory 1030. The processor 1010, the transceiver 1020, and the memory 1030 communicate with each other by using an internal connection path. A related function implemented by the transceiver module 910 in FIG. 8 may be implemented by the processor 1010 by controlling the transceiver 1020.

Optionally, the processor 1010 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data, and the central processing unit may be configured to: control a resource measurement apparatus (for example, a base station, a terminal, or a chip), execute a software program, and process data of the software program.

Optionally, the processor 1010 may include one or more processors, for example, include one or more central processing units (CPUs). When the processor is one CPU, the CPU may be a single-core CPU or a multi-core CPU.

The transceiver 1020 is configured to send and receive data and/or a signal, and receive data and/or a signal. The transceiver may include a transmitter and a receiver. The transmitter is configured to send data and/or a signal, and the receiver is configured to receive data and/or a signal.

The memory 1030 includes but is not limited to a random access memory (RAM), a read-only memory (ROM), an erasable programmable read-only memory (EPROM), and a compact disc read-only memory (CD-ROM). The memory 1030 is configured to store related instructions and data.

The memory 1030 is configured to store program code and data of the terminal, and may be an independent device or integrated into the processor 1010.

Specifically, the processor 1010 is configured to control the transceiver to perform information transmission with a terminal. For details, refer to the descriptions in the method embodiment, and details are not described herein again.

During specific implementation, in an embodiment, the apparatus 1000 may further include an output device and an input device. The output device communicates with the processor 1010, and may display information in a plurality of manners. For example, the output device may be a liquid crystal display (LCD), a light emitting diode (LED) display device, a cathode ray tube (CRT) display device, a projector, or the like. The input device communicates with the processor 1010, and may receive an input from a user in a plurality of manners. For example, the input device may be a mouse, a keyboard, a touchscreen device, or a sensing device.

It may be understood that FIG. 9 shows only a simplified design of the resource measurement apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 1000 may be a chip, for example, may be a communication chip applicable to the terminal, and configured to implement a related function of the processor 1010 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

An embodiment of this application further provides an apparatus. The apparatus may be a terminal or a circuit. The apparatus may be configured to perform an action performed by the terminal in the foregoing method embodiments.

Figure 10:
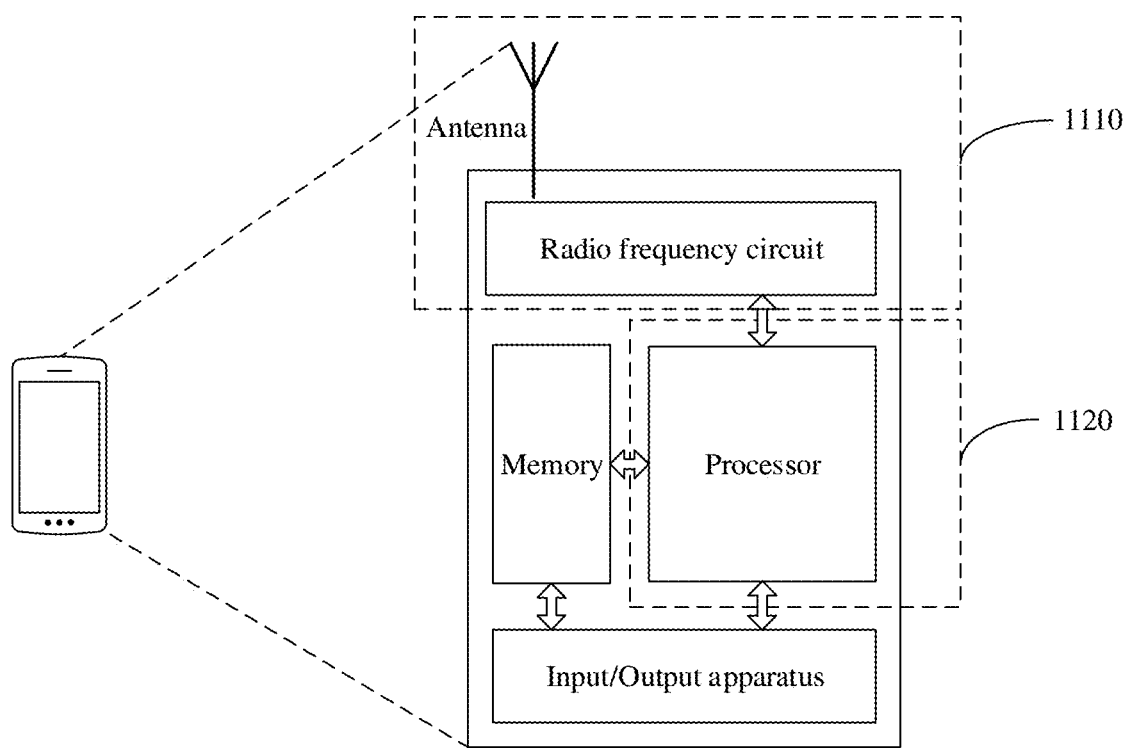
FIG. 10 is a schematic structural diagram of a resource measurement apparatus according to an embodiment of this application.

Optionally, when the apparatus in this embodiment is a terminal, FIG. 10 is a schematic diagram of a simplified structure of the terminal. For ease of understanding and illustration, in FIG. 10, a mobile phone is used as an example of the terminal. As shown in FIG. 10, the terminal includes a processor, a memory, a radio frequency circuit, an antenna, and an input/output apparatus. The processor is mainly configured to: process a communication protocol and communication data, control the terminal, execute a software program, process data of the software program, and the like.

The memory is mainly configured to store the software program and the data. The radio frequency circuit is mainly configured to perform conversion between a baseband signal and a radio frequency signal, and process a radio frequency signal. The antenna is mainly configured to send or receive a radio frequency signal in a form of an electromagnetic wave. The input/output apparatus, such as a touchscreen, a screen, or a keyboard, is mainly configured to: receive data entered by a user, and output data to the user. It needs to be noted that some types of terminals may not have the input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal in a form of an electromagnetic wave through the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, only one memory and one processor are shown in FIG. 10. In an actual terminal product, one or more processors and one or more memories may exist. The memory may also be referred to as a storage medium, a storage device, or the like. The memory may be disposed independently from the processor, or may be integrated with the processor. This is not limited in embodiments of this application.

In this embodiment of this application, the antenna having receiving and sending functions and the radio frequency circuit may be considered as a transceiver unit of the terminal, and the processor having a processing function is considered as a processing unit of the terminal. As shown in FIG. 10, the terminal includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. Sometimes the transceiver unit may also be referred to as a transceiver machine, a transceiver, a transceiver circuit, or the like. Sometimes the receiving unit may also be referred to as a receiver machine, a receiver, a receiving circuit, or the like. Sometimes the sending unit may also be referred to as a transmitter machine, a transmitter, a transmitting circuit, or the like.

It should be understood that the transceiver unit 1110 is configured to perform a sending operation and a receiving operation on a terminal side in the foregoing method embodiment, and the processing unit 1120 is configured to perform an operation other than the receiving/sending operation of the terminal in the foregoing method embodiments.

For example, in an implementation, the processing unit 1120 is configured to perform the processing steps on the terminal side in FIG. 3. The transceiver unit 1110 is configured to perform the sending and receiving operation in step 301, step 302, and step 303 in FIG. 3, and/or the transceiver unit 1110 is further configured to perform other sending and receiving steps on the terminal side in embodiments of this application.

When the apparatus is a chip, the chip includes a transceiver unit and a processing unit. The transceiver unit may be an input/output circuit or a communication interface. The processing unit is a processor, a microprocessor, or an integrated circuit integrated on the chip.

Figure 11:
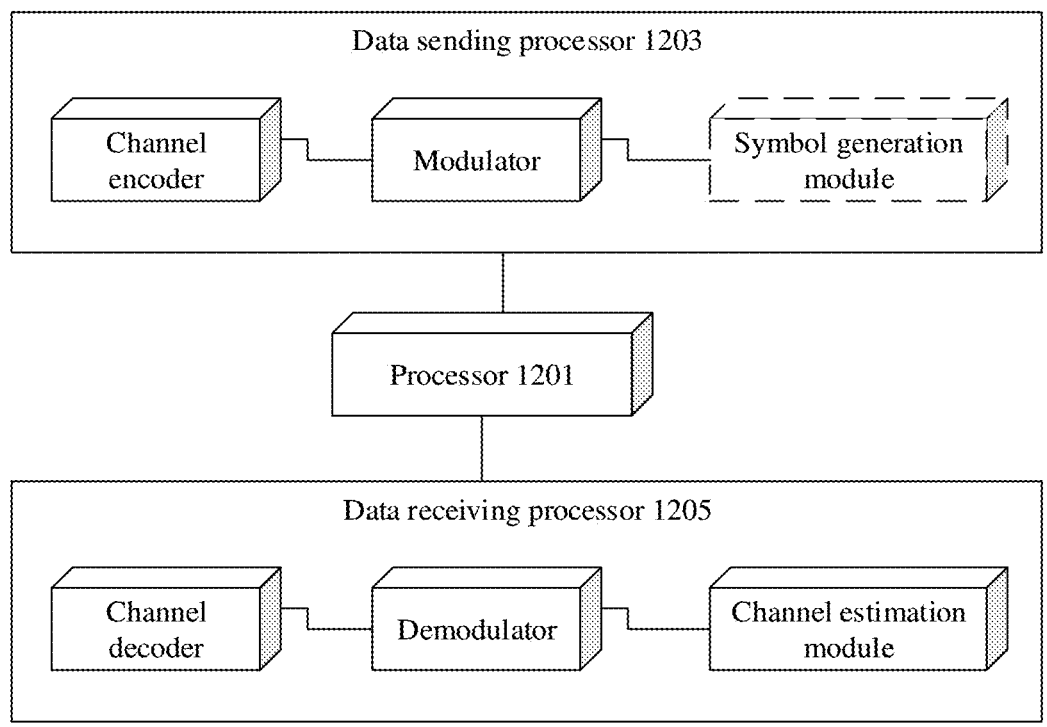
FIG. 11 is a schematic structural diagram of a resource measurement apparatus according to another embodiment of this application.

Optionally, when the apparatus is a terminal, reference may be further made to the device shown in FIG. 11. In an example, the device can implement functions similar to those of the processor 810 in FIG. 7. In FIG. 11, the device includes a processor 1201, a data sending processor 1203, and a data receiving processor 1205. The processing module 720 in the foregoing embodiment shown in FIG. 6 may be the processor 1201 in FIG. 11, and completes a corresponding function. The transceiver module 710 in the foregoing embodiment shown in FIG. 6 may be the data sending processor 1203 and the data receiving processor 1205 in FIG. 11. Although FIG. 11 shows a channel encoder and a channel decoder, it may be understood that the modules are merely examples, and do not constitute a limitation on this embodiment.

Figure 12:
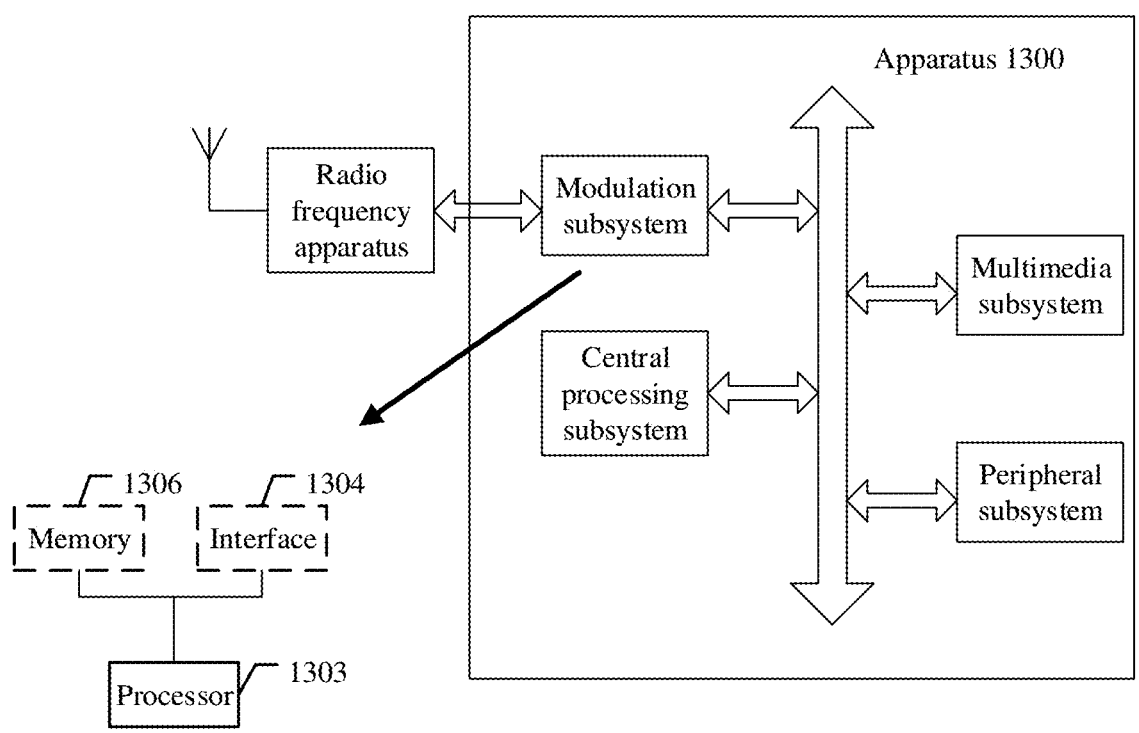
FIG. 12 is a schematic structural diagram of a resource measurement apparatus according to another embodiment of this application.

FIG. 12 shows another form of this embodiment. The processing apparatus 1300 includes modules such as a modulation subsystem, a central processing subsystem, and a peripheral subsystem. A communication device in this embodiment may be used as the modulation subsystem in the apparatus. Specifically, the modulation subsystem may include a processor 1303 and an interface 1304. The processor 1303 completes the functions of the processing module 720, and the interface 1304 completes the functions of the transceiver module 710. In another variation, the modulation subsystem includes a memory 1306, the processor 1303, and a program that is stored in the memory and that is executable in the processor. When the program is executed by the processor, the methods in the embodiments are implemented. It should be noted that the memory 1306 may be a nonvolatile memory or a volatile memory. The memory 1306 may be located in the modulation subsystem, or may be located in the processing apparatus 1300, provided that the memory 1306 can be connected to the processor 1303.

Figure 13:
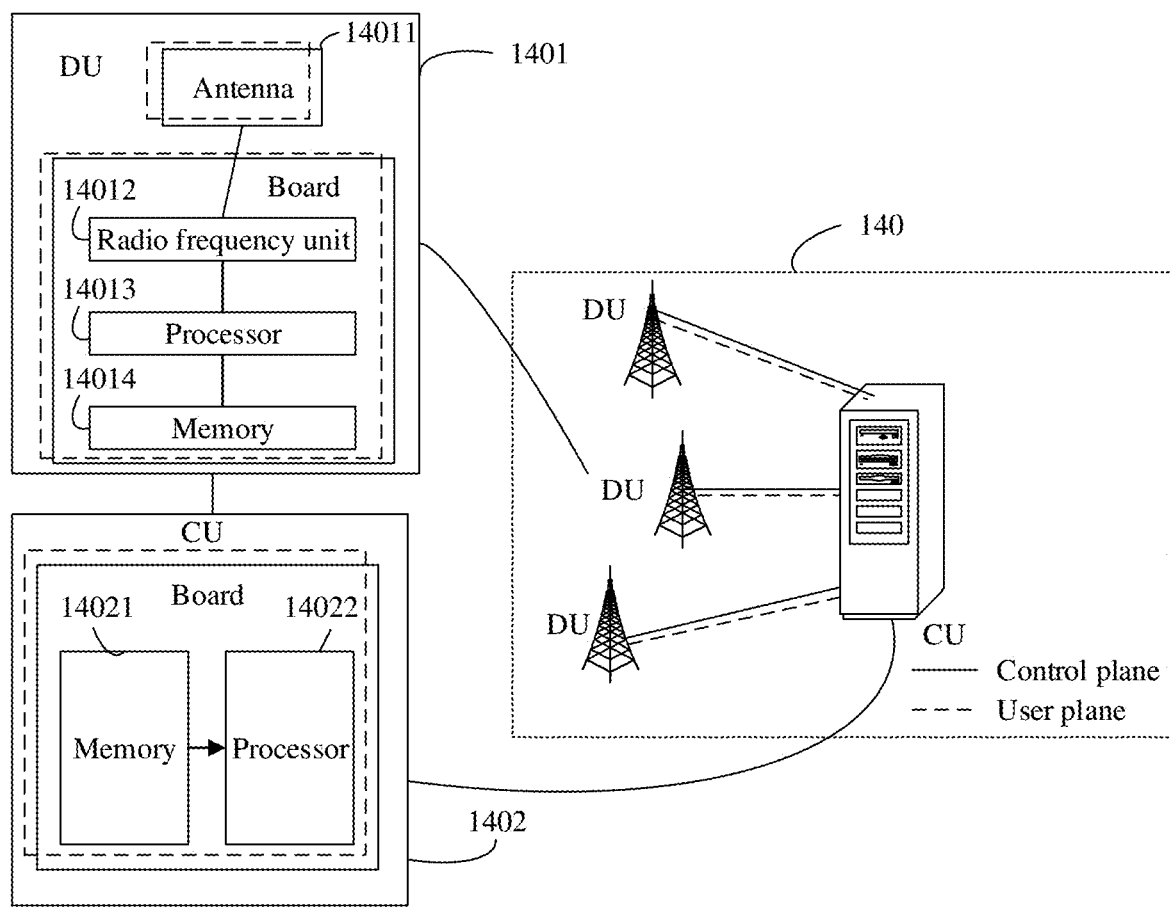
FIG. 13 is a schematic structural diagram of a resource measurement apparatus according to another embodiment of this application.

When the apparatus in this embodiment is a network device, the network device may be that shown in FIG. 13. For example, the apparatus 140 is a base station. The base station may be used in the system shown in FIG. 1, to perform a function of the network device in the foregoing method embodiments. The base station 140 may include one or more DUs 1401 and one or more CUs 1402. The CU 1402 may communicate with a next-generation core (NC) network. The DU 1401 may include at least one antenna 14011, at least one radio frequency unit 14012, at least one processor 14013, and at least one memory 14014. The DU 1401 is mainly configured to receive and send a radio frequency signal, convert a radio frequency signal and a baseband signal, and perform some baseband processing. The CU 1402 may include at least one processor 14022 and at least one memory 14021. The CU 1402 and the DU 1401 may communicate by using an interface. A control plane interface may be Fs-C, for example, F1-C, and a user plane interface may be Fs-U, for example, F1-U.

The CU 1402 is mainly configured to perform baseband processing, control the base station, and the like. The DU 1401 and the CU 1402 may be physically disposed together, or may be physically disposed separately, that is, may be distributed base stations. The CU 1402 is a control center of the base station, may also be referred to as a processing unit, and is mainly configured to complete a baseband processing function. For example, the CU 1402 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, optionally, the base station 140 may include one or more radio frequency units (RU), one or more DUs, and one or more CUs. The DU may include at least one processor 14013 and at least one memory 14014. The RU may include at least one antenna 14011 and at least one radio frequency unit 14012. The CU may include at least one processor 14022 and at least one memory 14021.

For example, in an implementation, the processor 14013 is configured to perform processing steps on a network device side in FIG. 3. The radio frequency unit 14012 is configured to perform receiving and sending operations in step 301, step 302, and step 303 in FIG. 3.

In an instance, the CU 1402 may include one or more boards, and a plurality of boards may jointly support a radio access network (for example, a 5G network) of a single access standard, or may separately support radio access networks (such as an LTE network, a 5G network, or another network) of different access standards. The memory 14021 and the processor 14022 may serve one or more boards. In other words, a memory and a processor may be disposed on each board. Alternatively, the plurality of boards may use a same memory and processor. In addition, a necessary circuit may further be disposed on each board. The DU 1401 may include one or more boards, and a plurality of boards may jointly support a radio access network (for example, a 5G network) of a single access standard, or may separately support radio access networks (such as an LTE network, a 5G network, or another network) of different access standards. The memory 14014 and the processor 14013 may serve one or more boards. In other words, a memory and a processor may be disposed on each board. Alternatively, the plurality of boards may use a same memory and processor. In addition, a necessary circuit may further be disposed on each board.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, the processor may be an integrated circuit chip, and has a signal processing capability. In an implementation process, the steps in the foregoing method embodiments can be implemented by using a hardware integrated logic circuit in the processor, or by using software-form instructions. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/"

generally represents an "or" relationship between the associated objects. "At least one of the following" or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

It should be understood that "an embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be further understood that "first", "second", and various numerical symbols in this specification are merely used for distinguishing for ease of description, and are not intended to limit the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions in the embodiments.

In addition, function units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by an apparatus, measurement configuration information, wherein the measurement configuration information includes 2 different resource sets;
   reporting, by the apparatus, K resource groups and information about a resource set of the 2 different resource sets to which a first resource belongs, wherein each resource group of the K resource groups comprises 2 resources, the 2 resources of each of the K resource groups respectively belong to different resource sets of the 2 different resource sets, the 2 resources of each of the K resource groups are able to be simultaneously received by the apparatus, and wherein K>1; and wherein a first resource group in the K resource groups is arranged in front of other resource groups of the K resource groups in a report format, the first resource group includes the first resource and a second resource, and a reference signal received power (RSRP) of the first resource is a largest RSRP among all resources of the K resource groups;

wherein in the first resource group, the first resource is arranged in front of the second resource in the report format; and wherein in each of the other resource groups of the K resource groups, one resource belonging to the same resource set as the first resource is arranged in front of the other resource of the respective resource group in the report format.

2. The method according to claim 1, wherein the information about the resource set of the 2 different resource sets to which the first resource belongs is represented by a field, and a length of the field is equal to 1 bit.

3. The method according to claim 1, further comprising:
reporting RSRP information of resources comprised in the K resource groups, wherein a sequence of the RSRP information of the resources comprised in the K resource groups is consistent with a sequence of the resources comprised in the K resource groups.

4. The method according to claim 1, wherein the K resource groups are included in a measurement result that is sent to a network device.

5. The method according to claim 1, wherein reporting, by the apparatus device, the K resource groups comprises:
reporting, by the apparatus, the K resource groups to a network device.

6. An apparatus, comprising:
one or more processors coupled to one or more memories and configured to execute instructions of the one or more memories, wherein execution of the instructions causes the apparatus to perform operations comprising:
receiving measurement configuration information, wherein the measurement configuration information includes 2 different resource sets;
reporting K resource groups and information about a resource set of the 2 different resource sets to which a first resource belongs, wherein each resource group of the K resource groups comprises 2 resources, the 2 resources of each of the K resource groups respectively belong to different resource sets of the 2 different resource sets, the 2 resources of each of the K resource groups are able to be simultaneously received by the apparatus, and wherein K>1; and
wherein a first resource group in the K resource groups is arranged in front of other resource groups of the K resource groups in a report format, the first resource group includes the first resource and a second resource, and a reference signal received power (RSRP) of the first resource is a largest RSRP among all resources of the K resource groups;
wherein in the first resource group, the first resource is arranged in front of the second resource in the report format; and
wherein in each of the other resource groups of the K resource groups, one resource belonging to the same resource set as the first resource is arranged in front of the other resource of the respective resource group in the report format.

7. The apparatus according to claim 6, wherein the K resource groups are included in a measurement result that is sent to a network device.

8. The apparatus according to claim 6, wherein the information about the resource set of the 2 different resource sets to which the first resource belongs is represented by a field, and a length of the field is equal to 1 bit.

9. The apparatus according to claim 6, wherein execution of the instructions causes the apparatus to perform operations further comprising:
reporting RSRP information of resources comprised in the K resource groups, wherein a sequence of the RSRP information of the resources comprised in the K resource groups is consistent with a sequence of the resources comprised in the K resource groups.

10. The apparatus according to claim 6, wherein reporting the K resource groups comprises:
reporting the K resource groups to a network device.

11. The apparatus according to claim 6, wherein the apparatus is a terminal device or a chip of the terminal device.

12. A method, comprising:
sending, by an apparatus, measurement configuration information to a terminal device, wherein the measurement configuration information includes 2 different resource sets;
receiving, by the apparatus, a measurement result from the terminal device, wherein the measurement result includes K resource groups, wherein each resource group of the K resource groups comprises 2 resources, the 2 resources of each of the K resource groups respectively belong to different resource sets of the 2 different resource sets, and the 2 resources of each of the K resource groups are able to be simultaneously received by the terminal device, and wherein K>1;
wherein a first resource group in the K resource groups is arranged in front of other resource groups of the K resource groups in a report format, the first resource group includes a first resource and a second resource, a reference signal received power (RSRP) of the first resource is a largest RSRP among all resources of the K resource groups;
wherein in the first resource group, the first resource is arranged in front of the second resource;
wherein the measurement result further comprises information about a resource set of the 2 different resource sets to which the first resource belongs; and
wherein in each of the other resource groups of the K resource groups, one resource belonging to the same resource set as the first resource is arranged in front of the other resource of the respective resource group.

13. The method according to claim 12, wherein the information about the resource set of the 2 different resource sets to which the first resource belongs is represented by a field, and a length of the field is equal to 1 bit.

14. The method according to claim 12, wherein the measurement result further comprises RSRP information of resources comprised in the K resource groups, wherein a sequence of the RSRP information of the resources comprised in the K resource groups is consistent with a sequence of the resources comprised in the K resource groups.

15. An apparatus, comprising:
one or more processors coupled to one or more memories and configured to execute instructions of the one or more memories, wherein execution of the instructions causes the apparatus to perform operations comprising:

sending measurement configuration information to a terminal device, wherein the measurement configuration information includes 2 different resource sets;

receiving a measurement result from the terminal device, wherein the measurement result includes K resource groups, wherein each resource group of the K resource groups comprises 2 resources, the 2 resources of each of the K resource groups respectively belong to different resource sets of the 2 different resource sets, and the 2 resources of each of the K resource groups are able to be simultaneously received by the terminal device, and wherein K>1;

wherein a first resource group in the K resource groups is arranged in front of other resource groups of the K resource groups in a report format, the first resource group includes a first resource and a second resource, a reference signal received power (RSRP) of the first resource is a largest RSRP among all resources of the K resource groups;

wherein in the first resource group, the first resource is arranged in front of the second resource;

wherein the measurement result further comprises information about a resource set of the 2 different resource sets to which the first resource belongs; and wherein in each of the other resource groups of the K resource groups, one resource belonging to the same resource set as the first resource is arranged in front of the other resource of the respective resource group.

16. The apparatus according to claim 15, wherein the information about the resource set of the 2 different resource sets to which the first resource belongs is represented by a field, and a length of the field is equal to 1 bit.

17. The apparatus according to claim 15, wherein the measurement result further comprises RSRP information of resources comprised in the K resource groups, wherein a sequence of the RSRP information of the resources comprised in the K resource groups is consistent with a sequence of the resources comprised in the K resource groups.

18. The apparatus according to claim 15, wherein the apparatus is a network device or a chip of the network device.

* * * * *

UNITED STATES PATENT AND TRADEMARK OFFICE
CERTIFICATE OF CORRECTION

| | | |
|---|---|---|
| PATENT NO. | : 12,483,916 B2 | Page 1 of 1 |
| APPLICATION NO. | : 17/720803 | |
| DATED | : November 25, 2025 | |
| INVENTOR(S) | : Fan et al. | |

It is certified that error appears in the above-identified patent and that said Letters Patent is hereby corrected as shown below:

In the Claims

In Column 47, in Claim 5, Line 36, delete "apparatus device," and insert -- apparatus, --.

Signed and Sealed this
Thirteenth Day of January, 2026

John A. Squires
*Director of the United States Patent and Trademark Office*